United States Patent
Oh et al.

(10) Patent No.: US 11,655,315 B2
(45) Date of Patent: May 23, 2023

(54) METHOD FOR PREPARING CATALYST FOR POLYMERIZING CONJUGATED DIENE, CATALYST AND METHOD FOR PREPARING CONJUGATED DIENE-BASED POLYMER USING THE SAME

(71) Applicant: LG Chem, Ltd., Seoul (KR)

(72) Inventors: Kyoung Hwan Oh, Daejeon (KR); Hee Jung Jeon, Daejeon (KR); Su Hwa Kim, Daejeon (KR); Jeong Heon Ahn, Daejeon (KR); Jin Sook Ryu, Daejeon (KR); Suk Youn Kang, Daejeon (KR)

(73) Assignee: LG Chem, Ltd.

( * ) Notice: Subject to any disclaimer, the term of this patent is extended or adjusted under 35 U.S.C. 154(b) by 198 days.

(21) Appl. No.: 16/650,681

(22) PCT Filed: Oct. 30, 2018

(86) PCT No.: PCT/KR2018/012960
§ 371 (c)(1),
(2) Date: Mar. 25, 2020

(87) PCT Pub. No.: WO2019/088634
PCT Pub. Date: May 9, 2019

(65) Prior Publication Data
US 2021/0040241 A1 Feb. 11, 2021

(30) Foreign Application Priority Data
Oct. 30, 2017 (KR) .................. 10-2017-0142547

(51) Int. Cl.
*C08F 4/54* (2006.01)
*C08F 8/00* (2006.01)
*C08F 136/06* (2006.01)

(52) U.S. Cl.
CPC ............... *C08F 4/545* (2013.01); *C08F 8/00* (2013.01); *C08F 136/06* (2013.01)

(58) Field of Classification Search
CPC .......... C08F 4/545; C08F 8/00; C08F 136/06
See application file for complete search history.

(56) References Cited

U.S. PATENT DOCUMENTS

| 5,017,539 A | 5/1991 | Jenkins et al. |
| 6,130,299 A | 10/2000 | Sone et al. |
| (Continued) | | |

FOREIGN PATENT DOCUMENTS

| CN | 101283024 A | 10/2008 |
| CN | 102532355 A | 7/2012 |
| (Continued) | | |

OTHER PUBLICATIONS

International Search Report for Application No. PCT/KR2018/012960 dated Jan. 29, 2019, 3 pages.

(Continued)

*Primary Examiner* — Catherine S Branch
(74) *Attorney, Agent, or Firm* — Lerner David LLP

(57) ABSTRACT

A method for preparing a catalyst for use in polymerizing a conjugated diene-based monomer, the catalyst, and a method for preparing a conjugated diene-based polymer using the same are disclosed herein. In an embodiment, a method of preparing a catalyst comprises mixing a lanthanide rare earth element-containing compound, an alkylating agent compound and a halogen compound in the presence of a solvent to prepare a catalyst composition, adding a conjugated diene-based monomer to the catalyst composition to form a preformed catalyst composition, and aging the preformed catalyst composition at a temperature of $-1°$ C. to $-15°$ C. for 3 hours to 98 hours to prepare the catalyst. The catalyst has excellent catalyst activity and polymerization (Continued)

reactivity and is useful for preparing a conjugated diene-based polymer which has an excellent modification ratio and improved compounding properties.

9 Claims, 5 Drawing Sheets

(56) References Cited

U.S. PATENT DOCUMENTS

| | | | |
|---|---|---|---|
| 6,136,931 | A | 10/2000 | Jang et al. |
| 2005/0283036 | A1 | 12/2005 | Barbotin et al. |
| 2009/0182106 | A1 | 7/2009 | Parola et al. |
| 2010/0222502 | A1 | 9/2010 | Tanaka et al. |
| 2012/0255661 | A1 | 10/2012 | Qin et al. |
| 2013/0172489 | A1 | 7/2013 | Kloppenburg et al. |
| 2013/0274407 | A1 | 10/2013 | Cortial et al. |
| 2017/0073443 | A1* | 3/2017 | Qin ................. C08F 136/06 |
| 2017/0275391 | A1 | 9/2017 | Kim et al. |
| 2017/0335032 | A1 | 11/2017 | McCauley et al. |
| 2018/0030174 | A1* | 2/2018 | Kang ................. C08F 36/04 |

FOREIGN PATENT DOCUMENTS

| | | | | |
|---|---|---|---|---|
| CN | 107207654 | A | 9/2017 | |
| EP | 0375421 | A1 | 6/1990 | |
| JP | H10158316 | A | 6/1998 | |
| JP | 2001139634 | A | 5/2001 | |
| JP | 2009512748 | A | 3/2009 | |
| JP | 2012528906 | A | 11/2012 | |
| JP | 5340556 | B2 | 11/2013 | |
| JP | 2016138279 | A | 8/2016 | |
| KR | 19910008275 | B | 10/1991 | |
| KR | 20000056722 | A | 9/2000 | |
| KR | 20010027534 | A | 4/2001 | |
| KR | 20020057922 | A | 7/2002 | |
| KR | 101075811 | B1 | 10/2011 | |
| KR | 1020170000754 | * | 1/2017 | ............ B60C 1/00 |
| KR | 101762461 | B1 | 7/2017 | |
| RU | 2139298 | C1 | 10/1999 | |
| WO | 9305083 | A1 | 3/1993 | |
| WO | 2016123370 | A1 | 8/2016 | |
| WO | 2016209042 | A1 | 12/2016 | |

OTHER PUBLICATIONS

European Search Report for Application No. EP18874346, dated Nov. 25, 2020, 10 pages.
Search Report dated Feb. 16, 2022 from Office Action for Chinese Application No. 201880062614.9 dated Feb. 25, 2022. 3 pgs.

* cited by examiner

METHOD FOR PREPARING CATALYST FOR POLYMERIZING CONJUGATED DIENE, CATALYST AND METHOD FOR PREPARING CONJUGATED DIENE-BASED POLYMER USING THE SAME

CROSS-REFERENCE TO RELATED APPLICATIONS

The present application is a national phase entry under 35 U.S.C. § 371 of International Application No. PCT/KR2018/012960, filed on Oct. 30, 2018, which claims priority from Korean Patent Application No. 10-2017-0142547, filed on Oct. 30, 2017, the disclosures of which are incorporated by reference herein.

TECHNICAL FIELD

The present invention relates to a method for preparing a catalyst for use in polymerizing a conjugated diene-based monomer, a catalyst, and a method for preparing a conjugated diene-based polymer using the same.

BACKGROUND ART

Recently, according to the growing attention on energy saving and environmental issues, the decrease of the fuel consumption ratio of cars is required. As a method for accomplishing the requirement, a method for decreasing the heating properties of tires using an inorganic filler such as silica and carbon black in a rubber composition for forming tires has been suggested. However, the dispersion of the inorganic filler in the rubber composition is not favorable, and defects of degrading overall physical properties of the rubber composition such as abrasion resistance, crack resistance and processability arise.

In order to solve such defects, a method of modifying the polymerization active part of a conjugated diene-based polymer which is obtained by anionic polymerization using organolithium with a functional group which is capable of interacting with an inorganic filler, has been developed as a method for increasing the dispersibility of the inorganic filler such as silica and carbon black in a rubber composition. Particularly, a method of modifying the polymerization active terminal of a conjugated diene-based polymer with a tin-based compound, a method of introducing an amino group, or a method of modifying with an alkoxysilane derivative has been suggested.

However, if a rubber composition is prepared using a modified conjugated diene-based polymer which is modified by the above-described methods, low heating properties may be secured, but the improving effects of the physical properties of a rubber composition such as abrasion resistance and processability were insufficient.

As another method, in a living polymer obtained by coordination polymerization using a catalyst including a lanthanide rare earth element compound, a method of modifying a living active terminal using a specific coupling agent or a modifier has been developed. However, in the conventionally known catalyst including a lanthanide rare earth element compound, the activity of the catalyst is low and the efficiency thereof is low, the activity of the living terminal of the polymer thus obtained is weak, and the modification ratio of the terminal is low, and thus, the improving effects of the physical properties of the rubber composition is insignificant.

(Patent Document 1) JP5340556 B2 (Aug. 16, 2013)

DISCLOSURE OF THE INVENTION

Technical Problem

The present invention has been devised to solve the above-mentioned problems of the conventional technique, and an object of the present invention is to provide a method for preparing a catalyst which has high catalyst activity so as to produce a conjugated diene-based polymer having improved compounding properties and a high modification ratio by using the catalyst.

In addition, another object of the present invention is to provide a catalyst prepared by the above-mentioned preparation method of a catalyst, and a method for preparing a conjugated diene-based polymer using the same.

In addition, another object of the present invention is to provide a conjugated diene-based polymer prepared by the above-mentioned preparation method of a conjugated diene-based polymer and having improved compounding properties and a high modification ratio.

Technical Solution

To solve the above-described tasks, there is provided in the present invention a method for preparing a catalyst for use in polymerizing a conjugated diene-based monomer, including preparing a catalyst composition by mixing a lanthanide rare earth element-containing compound, an alkylating agent compound, and a halogen compound in the presence of a solvent (S1); adding a conjugated diene-based monomer to the catalyst composition to form a preformed catalyst composition (S2); and aging the preformed catalyst composition at a temperature of −1° C. to −15° C. for 3 hours to 98 hours (S3) to prepare the catalyst.

Also, according to another embodiment of the present invention, there is provided a method for preparing a conjugated diene-based polymer including a step of polymerizing a conjugated diene-based monomer in the presence of a catalyst, wherein the catalyst is prepared by preforming a catalyst composition including a lanthanide rare earth element-containing compound, an alkylating agent compound, a halogen compound and a conjugated diene-based monomer in the presence of a solvent, and aging at −1° C. to −15° C. for 3 hours to 98 hours.

Advantageous Effects

In the method for preparing a catalyst for polymerizing a conjugated diene according to the present invention, by performing an aging process at a temperature of −1° C. to −15° C. for 3 hours to 98 hours, a catalyst with high activity may be prepared, compounding properties of a polymer prepared by using the catalyst, if applied to a rubber composition, such as 300% modulus and viscoelasticity properties represented by Tan δ may be excellent, and the modification ratio of the polymer may be improved.

BEST MODE FOR CARRYING OUT THE INVENTION

Figure 1:
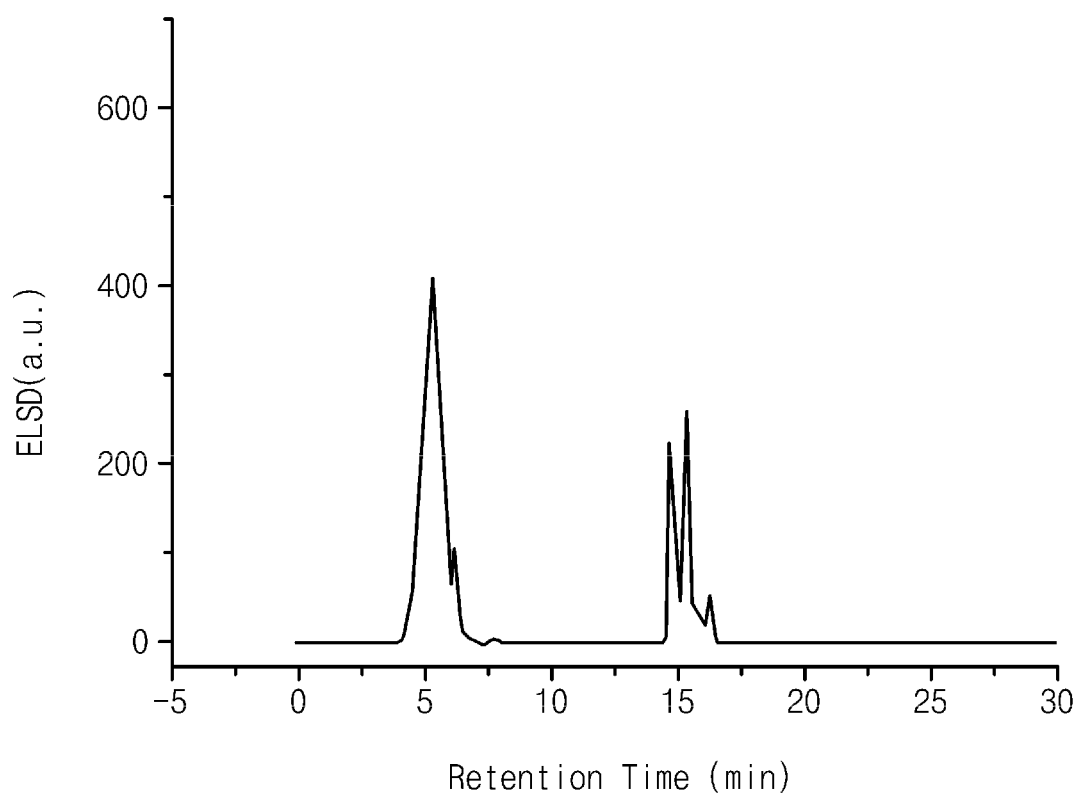
FIG. 1 is a graph showing a chromatogram of Example 1 of the present invention.

Hereinafter, the present invention will be described in more detail in order to assist the understanding of the present invention.

It will be understood that words or terms used in the description and claims shall not be interpreted as the meaning defined in commonly used dictionaries. It will be further understood that the words or terms should be interpreted as having a meaning that is consistent with their meaning of the technical idea of the invention, based on the principle that an inventor may properly define the meaning of the words or terms to best explain the invention.

The term "preforming" used in the present disclosure means pre-polymerization in a catalyst composition for use in polymerizing a conjugated diene-based monomer. In particular, if a catalyst composition for use in polymerizing a conjugated diene-based monomer, including a lanthanide rare earth element-containing compound, an alkylating agent including an aluminum compound, and a halogen compound includes diisobutyl aluminum hydride (hereinafter, DIBAH) as the aluminum compound, a small amount of a monomer such as butadiene is included together to decrease the production possibility of diverse catalyst active species. Accordingly, the pre-polymerization of butadiene in the catalyst composition for preparing a conjugated diene-based polymer is performed prior to the polymerization reaction for preparing a conjugated diene-based polymer, and this process is referred to as preforming.

In addition, the term "catalyst for use in polymerizing a conjugated diene-based monomer" in the present disclosure is a catalyst used for preparing a conjugated diene-based polymer and means a catalyst for preparing a conjugated diene-based polymer.

In addition, the term "premixing" used in the present disclosure means a homogenously mixed state of each of constituent components without being polymerized in a catalyst composition.

In addition, the term "catalyst composition" used in the present disclosure means a simple mixture of constituent components, diverse composites caused by physical or chemical attraction, or a chemical reaction product of constituent components.

According to an embodiment of the present invention, a method for preparing a catalyst for use in polymerizing a conjugated diene-based monomer, includes preparing a catalyst composition by mixing a lanthanide rare earth element-containing compound, an alkylating agent compound and a halogen compound (S1); adding a conjugated diene-based monomer to the catalyst composition and preforming (S2); and aging the preformed catalyst at a temperature of −1° C. to −15° C. for 3 hours to 98 hours.

In the method for preparing a catalyst for polymerizing a conjugated diene according to an embodiment of the present invention, the catalyst composition in step S1 includes (a) a lanthanide rare earth element-containing compound, (b) an alkylating agent and (c) a halogen compound.

Hereinafter, each component will be explained in detail.

(a) Lanthanide Rare Earth Element-Containing Compound

In the catalyst composition for polymerizing a conjugated diene according to an embodiment of the present invention, the lanthanide rare earth element-containing compound is activated by an alkylating agent to produce a catalyst active species for polymerizing a conjugated diene.

As the lanthanide rare earth element-containing compound, any one used for the preparation of a common conjugated diene-based polymer may be used, without specific limitation. Particularly, the lanthanide rare earth element-containing compound may be a compound including one or two or more rare earth metals of atomic numbers of 57 to 71 such as lanthanum, neodymium, cerium, gadolinium and praseodymium, and more particularly, a compound including one or two or more selected from the group consisting of neodymium, lanthanum and gadolinium, may be used. In the present description, the "lanthanide rare earth element-containing compound" may mean the same compound as a "rare earth metal compound".

In addition, the lanthanide rare earth element-containing compound may be rare earth metal-containing carboxylates (for example, neodymium acetate, neodymium acrylate, neodymium methacrylate, neodymium gluconate, neodymium citrate, neodymium fumarate, neodymium lactate, neodymium maleate, neodymium oxalate, neodymium 2-ethylhexanoate, neodymium neodecanoate, etc.), organic phosphates (for example, neodymium dibutyl phosphate, neodymium dipentyl phosphate, neodymium dihexyl phosphate, neodymium diheptyl phosphate, neodymium dioctyl phosphate, neodymium bis(1-methyl heptyl) phosphate, neodymium bis(2-ethylhexyl) phosphate, neodymium didecyl phosphate, etc.), organic phosphonates (for example, neodymium butyl phosphonate, neodymium pentyl phosphonate, neodymium hexyl phosphonate, neodymium heptyl phosphonate, neodymium octyl phosphonate, neodymium (1-methylheptyl) phosphonate, neodymium (2-ethylhexyl) phosphonate, neodymium decyl phosphonate, neodymium dodecyl phosphonate, neodymium octadecyl phosphonate, etc.), organic phosphinates (for example, neodymium butyl phosphinate, neodymium pentyl phosphinate, neodymium hexyl phosphinate, neodymium heptyl phosphinate, neodymium octyl phosphinate, neodymium (1-mthyl heptyl) phosphinate, neodymium (2-ethylhexyl) phosphinate, etc.), carbamates (for example, neodymium dimethyl carbamate, neodymium diethyl carbamate, neodymium diisopropyl carbamate, neodymium dibutyl carbamate, neodymium dibenzyl carbamate, etc.), dithio carbamates (for example, neodymium dimethyldithio carbamate, neodymium diethyldithio carbamate, neodymium diisopropyl dithio carbamate, neodymium dibutyl-dithio carbamate, etc.), xanthogenates (for example, neodymium methyl xanthogenate, neodymium ethyl xanthogenate, neodymium isopropyl xanthogenate, neodymium butyl xanthogenate, neodymium benzyl xanthogenate, etc.), β-diketonates (for example, neodymium acetylacetonate, neodymium trifluoroacetyl acetonate, neodymium hexafluoroacetyl acetonate, neodymium benzoyl acetonate, etc.), alkoxides or allyloxides (for example, neodymium methoxide, neodymium ethoxide, neodymium isopropoxide, neodymium phenoxide, neodymium nonyl phenoxide, etc.), halides or pseudo halides (neodymium fluoride, neodymium chloride, neodymium bromide, neodymium iodide, neodymium cyanide, neodymium cyanate, neodymium thiocyanate, neodymium azide, etc.), oxyhalides (for example, neodymium oxyfluoride, neodymium oxychloride, neodymium oxybromide, etc.), or organic lanthanide rare earth metal compounds including one or more rare earth metal-carbon bonds (for example, $Cp_3Ln$, Cp$_2$LnR, Cp$_2$LnCl, CpLnCl$_2$, CpLn (cyclooctatetraene), (C$_5$Me$_5$)$_2$LnR, LnR$_3$, Ln(allyl)$_3$, Ln(allyl)$_2$Cl, etc., where Ln is a rare earth metal element, and R is a hydrocarbyl group as defined above), etc. and may include any one or a mixture of two or more thereof.

More particularly, the lanthanide rare earth element-containing compound may be a neodymium compound represented by the following Formula 1:

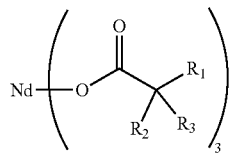
[Formula 1]

In Formula 1, R$_1$ to R$_3$ are each independently a hydrogen atom, or a linear or branched alkyl group of 1 to 12 carbon atoms.

Particularly, in Formula 1, R$_1$ to R$_3$ may not be hydrogen at the same time, and more particularly, the lanthanide rare earth element-containing compound may be a neodymium compound of Formula 1, where R$_1$ is a linear or branched alkyl group of 6 to 12 carbon atoms, R$_2$ and R$_3$ are each independently a hydrogen atom, or a linear or branched alkyl group of 2 to 6 carbon atoms, but R$_2$ and R$_3$ are not hydrogen atoms at the same time, and more particularly, may be a neodymium compound of Formula 1, where R$_1$ is a linear or branched alkyl group, and R$_2$ and R$_3$ are each independently a linear or branched alkyl group of 2 to 6 carbon atoms.

As described above, if the neodymium compound of Formula 1 includes a carboxylate ligand including an alkyl group with various lengths of 2 or more carbon atoms at an a (alpha) position as a substituent, steric change may be induced around a neodymium central metal to block tangling between compounds. As a result, oligomerization is suppressed and a conversion ratio into an active species is increased. Such neodymium compound has high solubility in a polymerization solvent, and the ratio of neodymium positioned in the central part, which has difficulty in conversion into a catalyst active species, is decreased to increase the conversion ratio into a catalyst active species.

More particularly, the lanthanide rare earth element-containing compound may be any one selected from the group consisting of Nd(2,2-diethyl decanoate)$_3$, Nd(2,2-dipropyl decanoate)$_3$, Nd(2,2-dibutyl decanoate)$_3$, Nd(2,2-dihexyl decanoate)$_3$, Nd(2,2-dioctyl decanoate)$_3$, Nd(2-ethyl-2-propyl decanoate)$_3$, Nd(2-ethyl-2-butyl decanoate)$_3$, Nd(2-ethyl-2-hexyl decanoate)$_3$, Nd(2-propyl-2-butyl decanoate)$_3$, Nd(2-propyl-2-hexyl decanoate)$_3$, Nd(2-propyl-2-isopropyl decanoate)$_3$, Nd(2-butyl-2-hexyl decanoate)$_3$, Nd(2-hexyl-2-octyl decanoate)$_3$, Nd(2,2-diethyl octanoate)$_3$, Nd(2,2-dipropyl octanoate)$_3$, Nd(2,2-dibutyl octanoate)$_3$, Nd(2,2-dihexyl octanoate)$_3$, Nd(2-ethyl-2-propyl octanoate)$_3$, Nd(2-ethyl-2-hexyl octanoate)$_3$, Nd(2,2-diethyl nonanoate)$_3$, Nd(2,2-dipropyl nonanoate)$_3$, Nd(2,2-dibutyl nonanoate)$_3$, Nd(2,2-dihexyl nonanoate)$_3$, Nd(2-ethyl-2-propyl nonanoate)$_3$ and Nd(2-ethyl-2-hexyl nonanoate)$_3$, or a mixture of two or more thereof. In addition, in consideration of excellent solubility in a polymerization solvent without fear of oligomerization, excellent conversion ratio into a catalyst active species and consequent improving effect of catalyst activity, the neodymium compound may be any one selected from the group consisting of Nd(2,2-diethyl decanoate)$_3$, Nd(2,2-dipropyl decanoate)$_3$, Nd(2,2-dibutyl decanoate)$_3$, Nd(2,2-dihexyl decanoate)$_3$, and Nd(2,2-dioctyl decanoate)$_3$, or a mixture of two or more thereof.

In addition, the lanthanide rare earth element-containing compound may have a solubility of about 4 g or more per 6 g of a non-polar solvent at room temperature (23±5° C.). In the present invention, the solubility of the neodymium compound means the degree of clear dissolution without generating turbid phenomenon. Through showing such high solubility, excellent catalyst activity may be attained.

The lanthanide rare earth element-containing compound may be used, for example, in an amount of 0.1 to 0.5 mmol, more particularly, 0.1 to 0.2 mmol per 100 g of a conjugated diene-based monomer used for polymerization, and within this range, catalyst activity is high, appropriate catalyst concentration is attained, and a separate demineralization process is not necessary.

The lanthanide rare earth element-containing compound may be used as a reaction product type with a Lewis base. Due to the Lewis base, the reaction product may attain improved solubility of the lanthanide rare earth element-containing compound in a solvent and may attain the effect of stable storage for a long time. The Lewis base may be used in a ratio of 30 mol or less, or 1 to 10 mol per 1 mol of a rare earth element. The Lewis base may be, for example, acetyl acetone, tetrahydrofuran, pyridine, N,N-dimethylformamide, thiophene, diphenyl ether, triethylamine, organophosphorous compounds or monohydric or dihydric alcohols.

(b) Alkylating Agent

In the catalyst composition for polymerizing a conjugated diene according to an embodiment of the present invention, the alkylating agent is an organometallic compound which is capable of delivering a hydrocarbyl group to another metal and plays the role of a co-catalyst. Any alkylating agents used for the preparation of a common diene-based polymer may be used as the alkylating agent, without specific limitation.

Particularly, the alkylating agent is soluble in a non-polar solvent, particularly, a non-polar hydrocarbon-based solvent, and may be an organometallic compound including a bond between a cationic metal such as metals in group 1, 2, or 3 with carbon, or a boron-containing compound. More particularly, the alkylating agent may be one or two or more selected from the group consisting of an organoaluminum compound, an organomagnesium compound, and an organolithium compound, or a mixture of at least two thereof.

In the alkylating agent, the organoaluminum compound may be, particularly, a compound of the following Formula 2:

$$Al(R)_z(X)_{3-z}$$ [Formula 2]

In Formula 2,

R is each independently a monovalent organic group which is combined with an aluminum atom via a carbon atom, and may be a hydrocarbyl group such as an alkyl group of 1 to 20 carbon atoms, a cycloalkyl group of 3 to 20 carbon atoms, an alkenyl group of 2 to 20 carbon atoms, a cycloalkenyl group of 3 to 20 carbon atoms, an aryl group of 6 to 20 carbon atoms, an arylalkyl group of 7 to 20 carbon atoms, an alkylaryl group of 7 to 20 carbon atoms, an allyl group, and an alkynyl group of 2 to 32 carbon atoms; or a heterohydrocarbyl group containing at least one heteroatom selected from the group consisting of a nitrogen atom, an oxygen atom, a boron atom, a silicon atom, a sulfur atom, and a phosphor atom in place of carbon in a hydrocarbyl structure, X is each independently selected from the group consisting of a hydrogen atom, a halogen group, a carboxyl group, an alkoxy group and an aryloxy group, z is an integer of 1 to 3.

More particularly, the organoaluminum compound may include dihydrocarbylaluminum hydride such as diethylaluminum hydride, di-n-propylaluminum hydride, diisopropylaluminum hydride, di-n-butylaluminum hydride, diisobutylaluminum hydride (DIBAH), di-n-octylaluminum hydride, diphenylaluminum hydride, di-p-tolylaluminum hydride, dibenzylaluminum hydride, phenylethylaluminum hydride, phenyl-n-propylaluminum hydride, phenylisopropylaluminum hydride, phenyl-n-butylaluminum hydride, phenylisobutylaluminum hydride, phenyl-n-octylaluminum hydride, p-tolylethylaluminum hydride, p-tolyl-n-propylaluminum hydride, p-tolylisopropylaluminum hydride, p-tolyl-n-butylaluminum hydride, p-tolylisobutylaluminum hydride, p-tolyl-n-octylaluminum hydride, benzylethylaluminum hydride, benzyl-n-propylaluminum hydride, benzylisopropylaluminum hydride, benzyl-n-butylaluminum hydride, benzylisobutylaluminum hydride and benzyl-n-octylaluminum hydride; hydrocarbylaluminum dihydride such as ethylaluminum dihydride, n-propylaluminum dihydride, isopropylaluminum dihydride, n-butylaluminum dihydride, isobutylaluminum dihydride, and n-octylaluminum dihydride, or the like. Preferably, diisobutylaluminum hydride may be included.

In addition, the organoaluminum compound may include aluminoxanes.

The aluminoxane may be prepared by reacting trihydrocarbyl aluminum-based compounds with water, and may particularly be linear aluminoxanes represented by the following Formula 3a or circular aluminoxanes represented by the following Formula 3b:

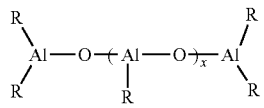

[Formula 3a]

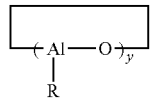

[Formula 3b]

In Formulae 3a and 3b, R is a monovalent organic group which is combined with an aluminum atom via a carbon atom and is the same as the above-defined R, x and y may be each independently an integer of 1 or more, particularly, 1 to 100, and more particularly, an integer of 2 to 50.

More particularly, the aluminoxane may be, methylaluminoxane (MAO), modified methylaluminoxane (MAO), ethylaluminoxane, n-propylaluminoxane, isopropylaluminoxane, butylaluminoxane, isobutylaluminoxane, n-pentylaluminoxane, neopentylaluminoxane, n-hexylaluminoxane, n-octylaluminoxane, 2-ethylhexylaluminoxane, cyclohexylaluminoxane, 1-methylcyclopentylaluminoxane, phenylaluminoxane or 2,6-dimethylphenyl aluminoxane, and any one or a mixture of at least two thereof may be used.

In addition, in the aluminoxane compound, the modified methylaluminoxane is obtained by substituting the methyl group of the methylaluminoxane with a modifier (R), particularly, a hydrocarbon group of 2 to 20 carbon atoms, and particularly, may be a compound represented by the following Formula 4:

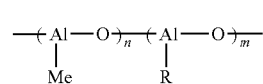

[Formula 4]

In Formula 4, R is the same as defined above, and m and n may be an integer of 2 or more. In addition, in Formula 4, Me means a methyl group.

More particularly, R in Formula 4 may be a linear or branched alkyl group of 2 to 20 carbon atoms, a cycloalkyl group of 3 to 20 carbon atoms, an alkenyl group of 2 to 20 carbon atoms, a cycloalkenyl group of 3 to 20 carbon atoms, an aryl group of 6 to 20 carbon atoms, an arylalkyl group of 7 to 20 carbon atoms, an alkylaryl group of 7 to 20 carbon atoms, an allyl group or an alkynyl group of 2 to 20 carbon atoms, and more particularly, may be a linear or branched alkyl group of 2 to 10 carbon atoms such as an ethyl group, an isobutyl group, a hexyl group and an octyl group, and even more particularly, may be an isobutyl group.

More particularly, the modified methylaluminoxane may be obtained by substituting about 50 mol % to 90 mol % of the methyl group of the methylaluminoxane with the hydrocarbon group. If the amount of the hydrocarbon group substituted in the modified methylaluminoxane is in the above-mentioned range, alkylation may be promoted and catalyst activity may increase.

Such modified methylaluminoxane may be prepared by a common method, and particularly, may be prepared using trimethylaluminum and an alkylaluminum other than trimethylaluminum. In this case, the alkylaluminum may be triisobutylaluminum, triethylaluminum, trihexylaluminum, or trioctylaluminum, and any one or a mixture of two or more thereof may be used.

Meanwhile, an organomagnesium compound as the alkylating agent includes at least one magnesium-carbon bond, and may be a magnesium compound dissoluble in a non-polar solvent, specifically, a non-polar hydrocarbon-based solvent. Particularly, the organomagnesium compound may be a compound represented by the following Formula 5a:

Mg(R)$_2$    [Formula 5a]

In Formula 5a, R is each independently a monovalent organic group and is the same as the above-defined R.

More particularly, the organomagnesium compound of Formula 5a may be an alkylmagnesium compound such as diethylmagnesium, di-n-propylmagnesium, diisopropylmagnesium, dibutylmagnesium, dihexylmagnesium, diphenylmagnesium, and dibenzylmagnesium.

In addition, the organomagnesium compound may be a compound represented by the following Formula 5b:

RMgX    [Formula 5b]

In Formula 5b, R is a monovalent organic group and is the same as the above defined R, X is selected from the group consisting of a hydrogen atom, a halogen group, a carboxyl group, an alkoxy group and an aryloxy group.

More particularly, the organomagnesium compound of Formula 5b may be a hydrocarbyl magnesium hydride such as methyl magnesium hydride, ethyl magnesium hydride, butyl magnesium hydride, hexyl magnesium hydride, phenyl magnesium hydride, benzyl magnesium hydride; a hydrocarbyl magnesium halide such as methyl magnesium chloride, ethyl magnesium chloride, butyl magnesium chloride, hexyl magnesium chloride, phenyl magnesium chloride, benzyl magnesium chloride, methyl magnesium bromide, ethyl magnesium bromide, butyl magnesium bromide, hexyl magnesium bromide, phenyl magnesium bromide, benzyl magnesium bromide; a hydrocarbyl magnesium carboxylate such as methyl magnesium hexanoate, ethyl magnesium hexanoate, butyl magnesium hexanoate, hexyl magnesium hexanoate, phenyl magnesium hexanoate, and benzyl magnesium hexanoate; a hydrocarbyl magnesium alkoxide such as methyl magnesium ethoxide, ethyl magnesium ethoxide, butyl magnesium ethoxide, hexyl magnesium ethoxide, phenyl magnesium ethoxide, benzyl magnesium ethoxide; or a hydrocarbyl magnesium aryloxide such as methyl magnesium phenoxide, ethyl magnesium phenoxide, butyl magnesium phenoxide, hexyl magnesium phenoxide, phenyl magnesium phenoxide, and benzyl magnesium phenoxide.

In addition, as the alkylating agent, an alkyl lithium of R'—Li as an organolithium compound (in this case, R' is a linear or branched alkyl group of 1 to 20 carbon atoms, and more particularly, a linear alkyl group of 1 to 8 carbon atoms) may be used. More particularly, methyllithium, ethyllithium, isopropyllithium, n-butyllithium, sec-butyllithium, t-butyllithium, isobutyllithium, pentyllithium, isopentyllithium, etc. may be used, and any one or a mixture of at least two thereof may be used.

Among the above compounds, an alkylating agent used in the present invention may be specifically, diisobutylaluminum hydride (DIBAH) which may play the role of a molecular weight controlling agent during polymerization.

In addition, the alkylating agent may be the modified methylaluminoxane considering that catalyst activity and reactivity may be improved by using a solvent system used during preparing a catalyst composition as a single phase solvent of an aliphatic hydrocarbon system.

(c) Halogen Compound

In the catalyst composition for polymerizing a conjugated diene according to an embodiment of the present invention, the kind of the halogen compound is not specifically limited, but any halogenating agents used in the preparation of a common diene-based polymer may be used without specific limitation.

Particularly, the halogen compound may be a diatomic halogen (simple substance), an interhalogen compound, hydrogen halide, organic halide, nonmetal halide, metal halide, or organometallic halide, etc., and any one or a mixture of two or more thereof may be used. Among them, in consideration of the improvement of catalyst activity and consequent improving effect of reactivity, the halogen compound may be any one selected from the group consisting of an organic halide, a metal halide and an organometallic halide, or a mixture of at least two thereof.

More particularly, the diatomic halogen may include fluorine, chlorine, bromine, or iodine.

In addition, the interhalogen compound may particularly include iodine monochloride, iodine monobromide, iodine trichloride, iodine pentafluoride, iodine monofluoride, iodine trifluoride, etc.

In addition, the hydrogen halide may particularly include hydrogen fluoride, hydrogen chloride, hydrogen bromide, or hydrogen iodide.

In addition, the organic halide may particularly include t-butyl chloride (t-BuCl), t-butyl bromide, allyl chloride, allyl bromide, benzyl chloride, benzyl bromide, chloro-di-phenylmethane, bromo-di-phenylmethane, triphenylmethyl chloride, triphenylmethyl bromide, benzylidene chloride, benzylidene bromide, methyltrichlorosilane, phenyltrichlorosilane, dimethyldichlorosilane, diphenyldichlorosilane, trimethylchlorosilane (TMSCl), benzoyl chloride, benzoyl bromide, propionyl chloride, propionyl bromide, methyl chloroformate, methyl bromoformate, iodomethane, diiodomethane, triiodomethane (also referred to as "iodoform"), tetraiodomethane, 1-iodopropane, 2-iodopropane, 1,3-diiodopropane, t-butyl iodide, 2,2-dimethyl-1-iodopropane (also referred to as "neopentyl iodide"), allyl iodide, iodobenzene, benzyl iodide, diphenylmethyl iodide, triphenylmethyl iodide, benzylidene iodide (also referred to as "benzal iodide"), trimethylsilyl iodide, triethylsilyl iodide, triphenylsilyl iodide, dimethyldiiodosilane, diethyldiiodosilane, diphenyldiiodosilane, methyltriiodosilane, ethyltriiodosilane, phenyltriiodosilane, benzoyl iodide, propionyl iodide, methyl iodoformate, or the like.

In addition, the nonmetal halide may particularly include phosphorus trichloride, phosphorus tribromide, phosphorus pentachloride, phosphorus oxychloride, phosphorus oxybromide, boron trifluoride, boron trichloride, boron tribromide, silicon tetrafluoride, silicon tetrachloride ($SiCl_4$), silicon tetrabromide, arsenic trichloride, arsenic tribromide, selenium tetrachloride, selenium tetrabromide, tellurium tetrachloride, tellurium tetrabromide, silicon tetraiodide, arsenic triiodide, tellurium tetraiodide, boron triiodide, phosphor triiodide, phosphor oxyiodide or selenium tetraiodide.

In addition, the metal halide may particularly include tin tetrachloride, tin tetrabromide, aluminum trichloride, aluminum tribromide, antimony trichloride, antimony pentachloride, antimony tribromide, aluminum tribromide, gallium trichloride, gallium tribromide, gallium trifluoride, indium trichloride, indium tribromide, indium trifluoride, titanium tetrachloride, titanium tetrabromide, zinc dichloride, zinc dibromide, zinc difluoride, aluminum triiodide, gallium triiodide, indium triiodide, titanium tetraiodide, zinc diiodide, germanium tetraiodide, tin tetraiodide, tin diiodide, antimony triiodide or magnesium diiodide.

In addition, the organometallic halide may particularly include dimethylaluminum chloride, diethylaluminum chloride, dimethylaluminum bromide, diethylaluminum bromide, dimethylaluminum fluoride, diethylaluminum fluoride, methylaluminum dichloride, ethylaluminum dichloride, methylaluminum dibromide, ethylaluminum dibromide, methylaluminum difluoride, ethylaluminum difluoride, methylaluminum sesquichloride, ethylaluminum sesquichloride (EASC), isobutylaluminum sesquichloride, methylmagnesium chloride, methylmagnesium bromide, ethylmagnesium chloride, ethylmagnesium bromide, n-butylmagnesium chloride, n-butylmagnesium bromide, phenylmagnesium chloride, phenylmagnesium bromide, benzylmagnesium chloride, trimethyltin chloride, trimethyltin bromide, triethyltin chloride, triethyltin bromide, di-t-butyltin dichloride, di-t-butyltin dibromide, di-n-butyltin dichloride, di-n-butyltin dibromide, tri-n-butyltin chloride, tri-n-butyltin bromide, methylmagnesium iodide, dimethylaluminum iodide, diethylaluminum iodide, di-n-butylaluminum iodide, diisobutylaluminum iodide, di-n-octylaluminum iodide, methylaluminum diiodide, ethylaluminum diiodide, n-butylaluminum diiodide, isobutylaluminum diiodide, methylaluminum sesquiiodide, ethylaluminum sesquiiodide, isobutylaluminum sesquiiodide, ethylmagnesium iodide, n-butylmagnesium iodide, isobutylmagnesium iodide, phenylmagnesium iodide, benzylmagnesium iodide, trimethyltin iodide, triethyltin iodide, tri-n-butyltin iodide, di-n-butyltin diiodide, di-t-butyltin diiodide, or the like.

In addition, the catalyst composition for preparing a conjugated diene polymer according to an embodiment of the present invention may include a non-coordinating anion-containing compound or a non-coordinating anion precursor compound together with the halogen compound instead of the halogen compound.

Particularly, in the compound containing a non-coordinating anion, the non-coordinating anion may be an anion not forming a coordination bond with the active center of a catalyst system due to steric hindrance and having a sterically large volume, and may be a tetraarylborate anion or a tetraarylborate fluoride anion. In addition, the compound containing a non-coordinating anion may include a carbonium cation such as a triaryl carbonium cation; an ammonium cation such as a N,N-dialkyl anilinium cation, or a counter cation such as a phosphonium cation together with the non-coordinating anion. More particularly, the compound containing the non-coordinating anion may be triphenylcarbonium tetrakis(pentafluorophenyl)borate, N,N-dimethylanilinium tetrakis(pentafluorophenyl)borate, triphenylcarbonium tetrakis[3,5-bis(trifluoromethyl) phenyl]borate, N,N-dimethylanilinium tetrakis[3,5-bis(trifluoromethyl)phenyl]borate, or the like.

In addition, as the non-coordinating anion precursor, a triaryl boron compound (BR"3, where R" is a strongly electron withdrawing aryl group such as a pentafluorophenyl group and a 3,5-bis(trifluoromethyl)phenyl group) may be used as a compound capable of forming a non-coordinating anion under reaction conditions.

The solvent according to an embodiment of the present invention may be a non-polar solvent having no reactivity with the components constituting the catalyst. Particularly, linear, branched or cyclic aliphatic hydrocarbon of 5 to 20 carbon atoms such as n-pentane, n-hexane, n-heptane, n-octane, n-nonane, n-decane, isopentane, isohexane, isooctane, 2,2-dimethylbutane, cyclopentane, cyclohexane, methylcyclopentane and methylcyclohexane; a mixture solvent of aliphatic hydrocarbon of 5 to 20 carbon atoms such as petroleum ether, petroleum spirits, and kerosene; or an aromatic hydrocarbon-based solvent such as benzene, toluene, ethylbenzene, and xylene, and any one or a mixture of two or more thereof may be used. More particularly, the non-polar solvent may be linear, branched or cyclic aliphatic hydrocarbon of 5 to 20 carbon atoms or a mixture solvent of aliphatic hydrocarbons, more particularly, n-hexane, cyclohexane, or a mixture thereof.

In addition, the reaction solvent may be appropriately selected according to the kind of the materials constituting the catalyst composition, specifically, the alkylating agent.

In particular, in case where an alkylaluminoxane such as methylaluminoxane (MAO) and ethylaluminoxane is used as the alkylating agent, it is not easily dissolved in an aliphatic hydrocarbon-based solvent, and an aromatic hydrocarbon-based solvent may be appropriately used.

In addition, in case where modified methylaluminoxane is used as the alkylating agent, an aliphatic hydrocarbon-based solvent may be appropriately used. In this case, a single solvent system may be achieved with an aliphatic hydrocarbon-based solvent such as hexane, which is mainly used as a polymerization solvent, and the polymerization reaction may be performed more favorably. In addition, the aliphatic hydrocarbon-based solvent may promote catalyst activity, and reactivity may be further improved due to such catalyst activity.

The above-described constituent components in the catalyst composition may form a catalytically active species via the interaction among them. Accordingly, the catalyst composition according to an embodiment of the present invention may include optimally combined amounts of the constituent components during polymerizing for forming a conjugated diene-based polymer so as to shown even better catalyst activity and excellent polymerization reactivity.

Particularly, the catalyst composition may include 5 mol to 200 mol of the alkylating agent with respect to 1 mol of the lanthanide rare earth element-containing compound. If the amount of the alkylating agent is less than 5 mol, the activating effect on the lanthanide rare earth element-containing compound may be insignificant, and if the amount is greater than 200 mol, the control of catalyst reaction during preparing a polymer may not be easy and the excessive amount of the alkylating agent may arise side reactions. More particularly, the catalyst composition may include 5 mol to 20 mol, more particularly, 5 mol to 15 mol of the alkylating agent with respect to 1 mol of the lanthanide rare earth element-containing compound considering the remarkable improving effect of processability.

In addition, the catalyst composition may include 1 mole to 20 moles, and may particularly include 2 moles to 6 moles of the halogen compound based on 1 mole of the lanthanide rare earth element-containing compound. If the amount of the halogen compound is less than 1 mole ratio, the generation of a catalyst active species is insufficient, and catalyst activity may be deteriorated. If the amount is greater than 20 mole ratio, the control of catalyst reaction is not easy, and the excessive amount of the halogen compound may induce side reactions.

In addition, the catalyst composition may further include 20 mol to 20,000 mol, more particularly, 100 mol to 1,000 mol of the solvent with respect to 1 mol of the lanthanide rare earth element-containing compound.

The catalyst composition having the above-mentioned configuration may be prepared by mixing a lanthanide rare earth element-containing compound, an alkylating compound and a halogen compound in the presence of a solvent according to a common method.

In this case, in order to promote the production of the catalyst active species, the mixing process may be performed in a temperature range of 0° C. to 40° C., particularly, 10° C. to 30° C., and heat treatment may be performed together to fulfill the above-mentioned temperature conditions.

More particularly, the catalyst composition may be prepared by mixing a lanthanide rare earth element-containing compound, an alkylating compound and a solvent, firstly heat treating at a temperature of 10° C. to 30° C., adding a halogen compound to the mixture thus obtained and secondly heat treating in a temperature range of 10° C. to 30° C.

In the catalyst composition prepared by the above-mentioned preparation method, catalyst active species may be produced due to the interaction of constituent components.

In the method for preparing a catalyst for use in polymerizing a conjugated diene-based monomer according to an embodiment of the present invention, step S2 is a step for preforming by adding a conjugated diene-based monomer to the catalyst composition. If such preforming is performed, catalyst activity may be improved and the conjugated diene-based polymer thus prepared may be further stabilized.

Particularly, any conjugated diene-based monomer used for preparing a common conjugated diene-based polymer may be used without specific limitation. Particularly, the conjugated diene-based monomer may include 1,3-butadiene, isoprene, 1,3-pentadiene, 1,3-hexadiene, 2,3-dimethyl-1,3-butadiene, 2-ethyl-1,3-butadiene, 2-methyl-1,3-pentadiene, 3-methyl-1,3-pentadiene, 4-methyl-1,3-pentadiene, and 2,4-hexadiene, and any one among them or a mixture of two or more thereof may be used.

In addition, the conjugated diene-based monomer may particularly be included in an amount of 1 eq to 100 eq, more particularly, 10 eq to 30 eq with respect to 1 eq of the lanthanide rare earth element-containing compound.

Step S3 according to an embodiment of the present invention is a step for aging the preformed catalyst composition at a temperature of −1° C. to −15° C. for 3 hours to 98 hours.

Particularly, step S3 may be performed at a temperature of −5° C. to −15° C., more preferably, at a temperature of −8° C. to −12° C.

In the present invention, if the aging temperature in step S3 is greater than −1° C., the aging temperature is too high and due to irreversible decomposition phenomenon of the catalyst active species, the catalyst activity of the catalyst thus prepared and the modification ratio of the polymer thus prepared using the prepared catalyst may be degraded. If the aging temperature is less than −15° C., the aging temperature is too low and the aging phenomenon of the catalyst active species may be delayed and the efficiency thereof may be degraded, and accordingly, may be uneconomical considering manufacturing costs, and further, the modification ratio of the polymer thus prepared using the catalyst may be degraded.

In addition, according to an embodiment of the present invention, step S3 may preferably be performed for 4 hours to 96 hours, more preferably, 10 hours to 40 hours, further more preferably, 17 hours to 20 hours.

If the aging time in step S3 is greater than 98 hours in the present invention, the aging time is too long and irreversible decomposition phenomenon may arise, and though the aging time is increased, any further increase of the modification ratio in the polymer thus prepared was not achieved, and any further improving effect in mechanical properties such as a M-300% modulus value, and viscoelasticity properties represented by Tan δ was not shown if applied to a rubber composition. Accordingly, unnecessary aging time may increase to degrade process efficiency in the preparation process of a catalyst. If the aging time is less than 3 hours, the aging time is too short, the catalyst active species may be insufficiently aged, and thus, the activity of a catalyst is decreased and the modification ratio of the polymer prepared using the prepared catalyst may be degraded.

As described above, in the method for preparing a catalyst for use in polymerizing a conjugated diene-based monomer according to an embodiment of the present invention, a preformed catalyst is aged at a temperature of −1° C. to −15° C. for 3 hours to 98 hours during preparing a catalyst for polymerizing a conjugated diene in the present invention, and a catalyst having high activity and excellent polymerization reactivity may be prepared. As a result, a conjugated diene-based polymer having high linearity and processability, producing a large amount of catalyst active species, increasing active parts which may react with a modifier in the polymer thus prepared, and having a high modification ratio may be prepared.

Meanwhile, according to an embodiment of the present invention, the aging of the catalyst may be performed under nitrogen ($N_2$) conditions. By applying stable nitrogen gas, the deterioration phenomenon of a catalyst, which may arise during an aging process, may be prevented, and harmless conditions to the human body may be achieved. In addition, considering environmental aspect, the generation of harmful materials may be suppressed.

In addition, in the modified conjugated diene-based polymer according to an embodiment of the present invention, since a conjugated diene-based polymer is prepared using the catalyst prepared by the above-mentioned preparation method, active parts which may react with a modifier in a polymer may increase, and the functional group of the modifier may be easily introduced in at least one terminal of a polymer chain, and thus, the polymer may achieve a high modification ratio. That is, the modified conjugated diene-based polymer according to the present invention may have markedly increased affinity with a filler when compared with a polymer having a relatively low modification ratio, and as a result, the tensile strength, abrasion resistance and viscoelasticity properties of a molded article manufactured using the same, for example, a tire, may be improved.

According to an embodiment of the present invention, a catalyst for use in polymerizing a conjugated diene-based monomer prepared by the preparation method of a catalyst as mentioned above and, if preparing a conjugated diene-based polymer, having a degree of catalyst activity of 800 kg[polymer]/mol[Nd]·h or more, preferably, 1000 kg[polymer]/mol[Nd]·h or more, more preferably, 2000 kg[polymer]/mol[Nd]·h or more during the polymerization in a temperature range of 20° C. to 90° C. for 5 minutes to 60 minutes, may be provided. In the present invention, the degree of catalyst activity is a value obtained from the injection mole ratio of the lanthanide rare earth element-containing compound with respect to the total amount obtained of the conjugated diene-based polymer thus prepared.

According to another embodiment of the present invention, there are provided in the present invention a conjugated diene-based polymer prepared using the catalyst and a method for preparing the same.

In other words, there are provided a method for preparing a conjugated diene-based polymer including a step of preparing a catalyst for use in polymerizing a conjugated diene-based monomer (step 1), including preparing a catalyst composition by mixing a lanthanide rare earth element-containing compound, an alkylating agent compound and a halogen compound (S1); adding a conjugated diene-based monomer to the catalyst composition to form a preformed catalyst composition (S2); and aging the preformed catalyst composition at a temperature of −1° C. to −15° C. for 3 hours to 98 hours (S3); and a step of polymerizing a conjugated diene-based monomer in the presence of the catalyst (step 2) to form a conjugated diene-based polymer.

Here, the method for preparing a conjugated diene-based polymer may further include a step of adding a modifier and performing modification reaction after step 2.

The conjugated diene-based polymer according to an embodiment of the present invention may be prepared by performing polymerization the reaction of a conjugated diene-based monomer according to a common method for preparing a conjugated diene polymer except for using the catalyst for polymerizing a conjugated diene, i.e., the catalyst aged at a temperature of −1° C. to −15° C. for 3 hours to 98 hours.

In this case, the polymerization reaction may be performed by radical polymerization and may be performed by various polymerization methods such as bulk polymerization, solution polymerization, suspension polymerization and emulsion polymerization, and may be also conducted by a batch method, a continuous method and a semi-continuous method. In a particular embodiment, the polymerization reaction for preparing the conjugated diene-based polymer may be performed by injecting a conjugated diene-based monomer to the catalyst composition and reacting in an organic solvent.

Particularly, if the preparation is performed by the solution polymerization, the conjugated diene polymer according to an embodiment of the present invention may be prepared by injecting a conjugated diene-based monomer to the catalyst for polymerizing in a polymerization solvent and reacting.

As the conjugated diene-based monomer, any one used for preparing a common conjugated diene-based polymer may be used, without specific limitation. The conjugated diene-based monomer may particularly be 1,3-butadiene, isoprene, 1,3-pentadiene, 1,3-hexadiene, 2,3-dimethyl-1,3-butadiene, 2-ethyl-1,3-butadiene, 2-methyl-1,3-pentadiene, 3-methyl-1,3-pentadiene, 4-methyl-1,3-pentadiene, 2,4-hexadiene, etc., and any one or a mixture of two or more thereof may be used. More particularly, the conjugated diene-based monomer may be 1,3-butadiene.

In addition, other monomers capable of being copolymerized with the conjugated diene monomer may be further used during the polymerization reaction in consideration of the physical properties of the conjugated diene polymer finally prepared. The other monomers may particularly include an aromatic vinyl monomer such as styrene, p-methylstyrene, α-methylstyrene, 1-vinylnaphthalene, 3-vinyltoluene, ethylvinylbenzene, divinylbenzene, 4-cyclohexylstyrene, and 2,4,6-trimethylstyrene, and any one or a mixture of two or more thereof may be used. The other monomers may be used in an amount of 20 wt % or less based on the total amount of the monomers used in the polymerization reaction.

In this case, the conjugated diene-based monomer is used not such that the total amount used for the preparation of a conjugated diene-based polymer is dissolved in a non-polar solvent, but such that a portion of the total amount is dissolved in a polymerization solvent and polymerized, and then injected in installments according to the polymerization conversion ratio in once or more times, particularly, in twice or more times, and more particularly, in twice to four times.

In addition, the polymerization solvent may be a non-polar solvent, and particular examples of this solvent may be the same as the solvents used for the preparation of a catalyst for polymerization. The polymerization solvent may be the same as the above-mentioned solvent used for the preparation of a catalyst for polymerization or may be different from each other. The concentration of the monomer used in the polymerization solvent is not specifically limited, but may be 3 wt % to 80 wt %, more particularly, 10 wt % to 30 wt %.

In addition, during the polymerization reaction, additives may be further used, including a molecular weight controlling agent such as trimethylaluminum, diisobutylaluminum hydride, and trimethylsilane; a reaction quenching agent such as polyoxyethylene glycol phosphate; and an antioxidant such as 2,6-di-t-butylparacresol. In addition, additives generally serving easy solution polymerization, particularly, additives such as a chelating agent, a dispersant, a pH controlling agent, a deoxidizer, and an oxygen scavenger may be used.

The polymerization reaction may be performed at a temperature of 0° C. to 200° C., more particularly, 20° C. to 100° C.

In addition, the polymerization reaction may be performed in the above-mentioned temperature range for 5 minutes to 3 hours, particularly, 10 minutes to 2 hours until the conversion ratio of the conjugated diene-based polymer reaches 100%.

From the result of the polymerization reaction, a conjugated diene-based polymer is produced.

The conjugated diene-based polymer may be a lanthanide rare earth element catalyzed conjugated diene-based polymer, which includes an active organometal part derived from a catalyst including a lanthanide rare earth element-containing compound (rare earth metal compound), more particularly, a lanthanide rare earth element catalyzed butadiene-based polymer containing a 1,3-butadiene monomer unit, more particularly, a neodymium catalyzed butadiene-based polymer containing a 1,3-butadiene monomer unit. In addition, the conjugated diene-based polymer may be a polybutadiene composed of only a 1,3-butadiene monomer.

The conjugated diene-based polymer produced by the polymerization reaction may be dissolved in a polymerization solvent, or may be obtained in a precipitated state. If the polymer is dissolved in the polymerization solvent, precipitation may be obtained by adding a lower alcohol including methyl alcohol or ethyl alcohol, or steam. Thus, the method of preparing a conjugated diene-based polymer according to an embodiment of the present invention may further include precipitation and separation processes on a conjugated diene-based polymer prepared after the polymerization reaction. In this case, filtering, separating and drying processes with respect to the precipitated conjugated diene-based polymer may be conducted by a common method.

As described above, in the method for preparing a conjugated diene-based polymer according to an embodiment of the present invention, a conjugated diene-based polymer having high linearity and processability may be prepared by performing an aging process at a temperature of −1° C. to −15° C. for 3 hours to 98 hours during preparing a catalyst.

In addition, the conjugated diene-based polymer according to an embodiment of the present invention may have narrow molecular weight distribution, i.e., have a polydispersity (PDI) of 3.4 or less, which is a ratio (Mw/Mn) of a weight average molecular weight (Mw) and a number average molecular weight (Mn). If the PDI of the conjugated diene-based polymer is greater than 3.4, and the polymer is applied in a rubber composition, mechanical properties such as abrasion resistance and impact resistance may be deteriorated. More particularly, the polydispersity of the conjugated diene-based polymer may be 2.0 to 3.5, more particularly, 2.0 to 2.5 in consideration of remarkable improving effect of the mechanical properties of the polymer according to the control of polydispersity.

In addition, the conjugated diene-based polymer according to an embodiment of the present invention may satisfy the above-mentioned molecular weight distribution conditions and at the same time, may have a weight average molecular weight (Mw) of 300,000 g/mol to 1,200,000 g/mol, particularly 400,000 g/mol to 1,000,000 g/mol. In addition, the conjugated diene-based polymer according to an embodiment of the present invention may have a number average molecular weight (Mn) of 100,000 g/mol to 700,000 g/mol, particularly 120,000 g/mol to 500,000 g/mol. If the conjugated diene-based polymer has a weight average molecular weight of less than 300,000 g/mol and a number average molecular weight of less than 100,000 g/mol, the elasticity of a vulcanizate may decrease, hysteresis loss may increase, and abrasion resistance may be degenerated. If the weight average molecular weight is greater than 1,200,000 g/mol or the number average molecular weight is greater than 700,000 g/mol, processability may be deteriorated, the workability of a rubber composition including the conjugated diene-based polymer may be degenerated, and mixing and kneading may become difficult, and thus, the physical properties of a rubber composition may be insufficiently improved. In the present invention, each of the weight average molecular weight and the number average molecular weight is a polystyrene conversion molecular weight which is analyzed by gel permeation type chromatography (GPC).

More particularly, if applied to a rubber composition and in consideration of improving effect of the mechanical properties, elasticity and processability of the rubber composition in balance, the conjugated diene-based polymer according to an embodiment of the present invention may preferably satisfy the polydispersity, the weight average molecular weight and the number average molecular weight at the same time. Particularly, the conjugated diene-based polymer has a ratio (Mw/Mn) of a weight average molecular weight (Mw) and a number average molecular weight (Mn) of 3.4 or less, a weight average molecular weight (Mw) of 300,000 g/mol to 1,200,000 g/mol, and a number average molecular weight (Mn) of 100,000 g/mol to 700,000 g/mol, more particularly, a ratio (Mw/Mn) of a weight average molecular weight (Mw) and a number average molecular weight (Mn) of 2.0 to 2.5, a weight average molecular weight (Mw) of 400,000 g/mol to 1,000,000 g/mol, and a number average molecular weight (Mn) of 120,000 g/mol to 500,000 g/mol.

In addition, the conjugated diene-based polymer may show high linearity since the catalyst undergoes an aging process during the preparation process thereof. Generally, with the increase of linearity, the degree of branching may decrease, and solution viscosity may increase. Particularly, if solution viscosity (SV) is divided by mooney viscosity (MV) to obtain a value and the corrected value thereof is referred to as linearity (SV/MV), the linearity (SV/MV) of the conjugated diene-based polymer according to an embodiment of the present invention may be 1 to 15, more particularly 3.5 to 13.

In addition, the mooney viscosity (MV) of the conjugated diene-based polymer at 100° C. may be 10 to 90, particularly, 40 to 80, more particularly, 40 to 70. In addition, the solution viscosity of the conjugated diene-based polymer may be 100 mPa·s to 600 mPa·s, particularly, 120 mPa·s to 500 mPa·s.

In the present invention, the mooney viscosity may be measured, for example, using MV2000E manufactured by Monsanto Co., Ltd. using Large Rotor at 100° C. at a rotor speed of 2±0.02 rpm. In this case, a specimen used is stood at room temperature (23±3° C.) for 30 minutes or more, and 27±3 g of the specimen is collected and put in a die cavity, and then, the mooney viscosity may be measured by operating Platen. In addition, in the present invention, the solution viscosity (SV) was measured by the same method for measuring the mooney viscosity, but the viscosity of a polymer in 5% toluene was measured at 20° C.

More particularly, in consideration of remarkable improving effect according to the control of the mooney viscosity and the solution viscosity, the conjugated diene-based polymer according to an embodiment of the present invention may have a mooney viscosity (MV) at 100° C. of 40 to 70, a solution viscosity (SV) of 10 mPa·s to 600 mPa·s, and a linearity (SV/MV) of 3 to 13.

In addition, the conjugated diene-based polymer according to an embodiment of the present invention may have the cis content in the conjugated diene-based polymer, if measured by Fourier transform infrared spectroscopy, particularly, the cis-1.4 bond content of 95% or more, more particularly, 96% or more. In addition, the vinyl bond content in the conjugated diene-based polymer may be 1% or less. If the cis-1,4 bond content in a polymer is high as described above, linearity may increase, and if mixed into a rubber composition, the abrasion resistance and cracking resistance of the rubber composition may be improved.

In addition, the conjugated diene-based polymer according to an embodiment of the present invention has pseudo-living properties. Accordingly, a polymer may be modified via the modification process of the terminal thereof for functionalizing using a functional group such as a group having an interaction with an inorganic filler such as carbon black and silica. In this case, the method for preparing a conjugated diene-based polymer according to an embodiment of the present invention may further include a modification process using a modifier with respect to the conjugated diene-based polymer prepared as the result of polymerization reaction.

The modification process may be performed by a common modification method except for using the conjugated diene-based polymer according to the present invention.

In addition, as the modifier, a compound which may impart a polymer with the functional group or increase a molecular weight via coupling during the reaction with a conjugated diene-based polymer, may be used. Particularly, one or more functional groups selected from an azacyclopropane group, a ketone group, a carboxyl group, a thiocarboxyl group, a carbonate group, a carboxylic anhydride group, a metal carboxylate, an acid halogenide, an urea group, a thiourea group, an amide group, a thioamide group, an isocyanate group, a thioisocyanate group, a halo-isocyano group, an epoxy group, a thioepoxy group, an imine group and an M-Z bond (where M is selected from the group consisting of Sn, Si, Ge and P, and Z is a halogen atom) may be included, but an activated proton and an onium salt, which deactivate the activated organometallic part, may not be included. More particularly, the terminal modifier may be any one selected from the group consisting of alkoxysilane, an imine-containing compound, an ester, a carboxylate, an ester-carboxylate metal complex, an alkyl ester carboxylate metal complex, an aldehyde or ketone, an amide, an isocyanate, an isothiocyanate, an imine and an epoxide, or a mixture of two or more thereof. In an embodiment, the modifier may include ethyl 1-(trimethylsilyl)piperidine-4-carboxylate or (E)-N,N-dimethyl-4-((undecylimino)methyl)benzenamine. The modifier may be used in an amount of 0.01 eq to 200 eq, more particularly, 0.1 eq to 150 eq based on 1 eq of the lanthanide rare earth element-containing compound.

The conjugated diene-based polymer prepared through the modification process includes a functional group derived from a modifier in the polymer, particularly, at the terminal thereof. Particularly, the functional group derived from a modifier may be any one or two or more selected from an azacyclopropane group, a ketone group, a carboxyl group, a cyano group, a thiocarboxyl group, a carbonate, a carboxylic acid anhydride, a metal carboxylate, an acid halogenide, an urea group, a thiourea group, an amide group, a thioamide group, an isocyanate group, a thioisocyanate group, a halo-isocyano group, an epoxy group, a thioepoxy group, an imine group and an M-Z bond (where M is selected from the group consisting of Sn, Si, Ge and P, and Z is a halogen atom). By including such a functional group derived from a modifier, good affinity with respect to an inorganic filler such as carbon black and silica, which is used during preparing a rubber composition, may be shown, and the dispersity thereof may be increased. As a result, the physical properties of a rubber composition may be further improved.

According to another embodiment of the present invention, there is provided a conjugated diene-based polymer, which is prepared by the above-described preparation method and is modified with a modification ratio of 10% to 50%, more particularly, 25% to 35%. Here, the "modification ratio" represents the ratio of the functional group derived from the compound commonly applied as a modifier in the modified conjugated diene-based polymer, and the modification ratio may be calculated according to the following Mathematical Formula 1 using a chromatogram obtained by measuring the chromatography of an unmodified polymer and a modified polymer:

[Mathematical Formula 1]
$$\text{modification ratio (\%)} = \frac{\text{peak area of modified polymer}}{\text{peak area of unmodified polymer} + \text{peak area of modified polymer}} \times 100$$

In addition, % applied in the modification ratio may mean a percentage on peak areas.

Further, the present invention provides a rubber composition including the conjugated diene-based polymer, and a molded article manufactured from the rubber composition.

The rubber composition according to an embodiment of the present invention may include the conjugated diene-based polymer in an amount of 0.1 wt % to 100 wt %, particularly, 10 wt % to 100 wt %, more particularly, 20 wt % to 90 wt %. If the amount of the conjugated diene-based polymer is less than 0.1 wt %, the improving effects of the abrasion resistance and crack resistance of a molded article manufactured using the rubber composition, for example, a tire may be insignificant.

In addition, the rubber composition may further include other rubber components in addition to the modified conjugated diene-based polymer as necessary, and in this case, the rubber components may be included in an amount of 90 wt % or less with respect to the total weight of the rubber composition. Particularly, the rubber components may be included in an amount of 1 part by weight to 900 parts by weight with respect to 100 parts by weight of the modified conjugated diene-based polymer.

The rubber component may be a natural rubber or a synthetic rubber, for example, the rubber component may be a natural rubber (NR) including cis-1,4-polyisoprene; a modified natural rubber which is obtained by modifying or purifying a common natural rubber, such as an epoxidized natural rubber (ENR), a deproteinized natural rubber (DPNR), and a hydrogenated natural rubber; and a synthetic rubber such as a styrene-butadiene copolymer (SBR), a polybutadiene (BR), a polyisoprene (IR), a butyl rubber (IIR), an ethylene-propylene copolymer, a polyisobutylene-co-isoprene, a neoprene, a poly(ethylene-co-propylene), a poly(styrene-co-butadiene), a poly(styrene-co-isoprene), a poly(styrene-co-isoprene-co-butadiene), a poly(isoprene-co-butadiene), a poly(ethylene-co-propylene-co-diene), a polysulfide rubber, an acryl rubber, a urethane rubber, a silicone rubber, an epichlorohydrin rubber, a butyl rubber, and a halogenated butyl rubber, and any one or a mixture of two or more thereof may be used.

In addition, the rubber composition may include 0.1 parts by weight to 150 parts by weight of a filler with respect to 100 parts by weight of the conjugated diene-based polymer, and the filler may be a silica-based filler, carbon black or a combination thereof. Particularly, the filler may be carbon black.

The carbon black filler is not specifically limited but may have a nitrogen adsorption specific surface area of, for example, 20 m$^2$/g to 250 m$^2$/g (measured based on N2SA, JIS K 6217-2:2001). Also, the carbon black may have a dibutylphthalate oil absorption amount (DBP) of 80 cc/100 g to 200 cc/100 g. If the nitrogen adsorption specific surface area of the carbon black is greater than 250 m$^2$/g, the processability of the rubber composition may be deteriorated, and if the nitrogen adsorption specific surface area of the carbon black is less than 20 m$^2$/g, reinforcing performance by the carbon black may be insignificant. In addition, if the DBP oil absorption amount of the carbon black is greater than 200 cc/100 g, the processability of the rubber composition may be deteriorated, and if the DBP oil absorption amount of the carbon black is less than 80 cc/100 g, reinforcing performance by the carbon black may be insignificant.

In addition, the silica is not specifically limited, but may include, for example, wet silica (hydrated silicate), dry silica (anhydrous silicate), calcium silicate, aluminum silicate or colloid silica. Particularly, the silica may be wet silica which has the most remarkable compatibility effect of the improving effect of destruction characteristics and wet grip. In addition, the silica may have nitrogen absorption specific surface area (nitrogen surface area per gram, N2SA) of 120 m$^2$/g to 180 m$^2$/g, and cetyl trimethyl ammonium bromide (CTAB) absorption specific surface area of 100 m$^2$/g to 200 m$^2$/g. If the nitrogen absorption specific surface area of the silica is less than 120 m$^2$/g, the reinforcing performance due to silica may be deteriorated, and if the nitrogen absorption specific surface area of the silica is greater than 180 m$^2$/g, the processability of the rubber composition may be deteriorated. In addition, if the CTAB absorption specific surface area of the silica is less than 100 m$^2$/g, the reinforcing performance by the silica filler may be deteriorated, and if the CTAB absorption specific surface area of the silica is greater than 200 m$^2$/g, the processability of the rubber composition may be deteriorated.

Meanwhile, if the silica is used as the filler, a silane coupling agent may be used together for the improvement of reinforcing and low heating properties.

The silane coupling agent may particularly include bis(3-triethoxysilylpropyl)tetrasulfide, bis(3-triethoxysilylpropyl) trisulfide, bis(3-triethoxysilylpropyl)disulfide, bis(2-triethoxysilylethyl) tetrasulfide, bis(3-trimethoxysilylpropyl) tetrasulfide, bis(2-trimethoxysilylethyl)tetrasulfide, 3-mercaptopropyltrimethoxysilane, 3-mercaptopropyltriethoxysilane, 2-mercaptoethyltrimethoxysilane, 2-mercaptoethyltriethoxysilane, 3-trimethoxysilylpropyl-N,N-dimethylthiocarbamoyltetrasulfide, 3-triethoxysilylpropyl-N,N-dimethylthiocarbamoyltetrasulfide, 2-triethoxysilylethyl-N,N-dimethylthiocarbamoyltetrasulfide, 3-trimethoxysilylpropylbenzothiazolyltetrasulfide, 3-triethoxysilylpropylbenzolyltetrasulfide, 3-triethoxysilylpropylmethacrylatemonosulfide, 3-trimethoxysilylpropylmethacrylatemonosulfide, bis(3-diethoxymethylsilylpropyl)tetrasulfide, 3-mercaptopropyldimethoxymethylsilane, dimethoxymethylsilylpropyl-N,N-dimethylthiocarbamoyltetrasulfide, or dimethoxymethylsilylpropylbenzothiazolyltetrasulfide, and any one among them or a mixture of two or more thereof may be used. More particularly, the silane coupling agent may be bis(3-triethoxysilylpropyl)polysulfide or 3-trimethoxysilylpropylbenzothiazyltetrasulfide in consideration of the improving effect of reinforcing properties.

In addition, the rubber composition according to an embodiment of the present invention may be sulfur cross-linkable, and so may further include a vulcanizing agent.

The vulcanizing agent may particularly be a sulfur powder and may be included in an amount of 0.1 parts by weight to 10 parts by weight with respect to 100 parts by weight of the rubber component. With the amount used in the above range, elasticity and strength required for a vulcanized rubber composition may be secured, and at the same time, a low fuel consumption ratio may be attained.

In addition, the rubber composition according to an embodiment of the present invention may further include various additives used in a common rubber industry in addition to the above-mentioned components, particularly, a vulcanization accelerator, a process oil, a plasticizer, an antiaging agent, a scorch preventing agent, a zinc white, stearic acid, a thermosetting resin, a thermoplastic resin, or the like.

The vulcanization accelerator is not specifically limited, and may particularly include a thiazole-based compound such as 2-mercaptobenzothiazole (M), dibenzothiazyldisulfide (DM), and N-cyclohexyl-2-benzothiazylsulfenamide (CZ), or a guanidine-based compound such as diphenylguanidine (DPG). The vulcanization accelerator may be included in an amount of 0.1 parts by weight to 5 parts by weight with respect to 100 parts by weight of the rubber component.

In addition, the process oil acts as a softener in a rubber composition and may particularly include a paraffin-based, naphthene-based, or aromatic compound. More particularly, an aromatic process oil may be used in consideration of tensile strength and abrasion resistance, and a naphthene-based or paraffin-based process oil may be used in consideration of hysteresis loss and properties at low temperature. The process oil may be included in an amount of 100 parts by weight or less with respect to 100 parts by weight of the rubber component. With the above-described amount range, the deterioration of the tensile strength and low exothermic properties (low fuel consumption ratio) of a vulcanized rubber may be prevented.

In addition, the antiaging agent may particularly include N-isopropyl-N'-phenyl-p-phenylenediamine, N-(1,3-dimethylbutyl)-N'-phenyl-p-phenylenediamine, 6-ethoxy-2,2,4-trimethyl-1,2-dihydroquinoline, or a condensate of diphenylamine and acetone at a high temperature. The antiaging agent may be used in an amount of 0.1 parts by weight to 6 parts by weight with respect to 100 parts by weight of the rubber component.

The rubber composition according to an embodiment of the present invention may be obtained by mulling using a mulling apparatus such as a banbury mixer, a roll, and an internal mixer according to a mixing prescription. In addition, a rubber composition having low heating properties and excellent abrasion resistance may be obtained by a vulcanization process after a molding process.

Therefore, the rubber composition may be useful for the manufacture of each member of a tire such as a tire tread, an under tread, a side wall, a carcass coating rubber, a belt coating rubber, a bead filler, a chafer, and a bead coating rubber, or for the manufacture of rubber products in various industries such as a vibration-proof rubber, a belt conveyor, and a hose.

The molded article manufactured using the rubber composition may include tires or tire treads.

Hereinafter, the present invention will be explained in particular referring to embodiments. However, the embodiments below are only for illustrating the present invention, and the scope of the present invention is not limited thereto.

Example 1

To a hexane solvent, a neodymium carboxylic acid compound was added and diisobutylaluminum hydride (DIBAH) and diethylaluminum chloride (DEAC) were added thereto one by one so that the molar ratio of neodymium carboxylic acid compound:DIBAH:DEAC=1.0:12.0:2.4 was satisfied, followed by mixing at 20° C. for 10 minutes to prepare a catalyst composition. To the catalyst composition thus prepared, 10 mol of 1,3-butadiene was added with respect to a neodymium catalyst to perform preforming. The preformed catalyst was aged at −10° C. for 4 hours to prepare a catalyst for polymerizing a conjugated diene.

Example 2

A catalyst for polymerizing a conjugated diene was prepared by performing the same method described in Example 1 except for changing the aging time to 18 hours.

Example 3

A catalyst for polymerizing a conjugated diene was prepared by performing the same method described in Example 1 except for changing the aging time to 96 hours.

Example 4

A catalyst for polymerizing a conjugated diene was prepared by performing the same method described in Example 1 except for changing the aging temperature to −5° C.

Example 5

A catalyst for polymerizing a conjugated diene was prepared by performing the same method described in Example 1 except for changing the aging temperature to −15° C.

Comparative Example 1

To a hexane solvent, a neodymium carboxylic acid compound was added and diisobutylaluminum hydride (DIBAH) and diethylaluminum chloride (DEAC) were added thereto one by one so that the molar ratio of neodymium carboxylic acid compound:DIBAH:DEAC=1.0:12.0:2.4 was satisfied, followed by mixing at 20° C. for 10 minutes to prepare a catalyst composition, and this was used as a catalyst for polymerizing a conjugated diene. To the catalyst composition thus prepared, 10 mol of 1,3-butadiene was added with respect to a neodymium catalyst to perform preforming to prepare a catalyst for polymerizing a conjugated diene.

Comparative Example 2

A catalyst for polymerizing a conjugated diene was prepared by aging the preformed catalyst in Comparative Example 1 at −20° C. for 4 hours.

Comparative Example 3

A catalyst for polymerizing a conjugated diene was prepared by performing the same method described in Comparative Example 2 except for changing the aging temperature to 20° C.

Comparative Example 4

A catalyst for polymerizing a conjugated diene was prepared by performing the same method described in Example 1 except for changing the aging time to 1 hour.

Comparative Example 5

A catalyst for polymerizing a conjugated diene was prepared by performing the same method described in Example 1 except for changing the aging time to 168 hours.

Experimental Example 1

Modified conjugated diene polymers were prepared using the catalysts for polymerizing conjugated dienes, prepared in the Examples and Comparative Examples, as follows.

To a completely dried reactor, vacuum and nitrogen were alternately applied. To the reactor in vacuum, 4.7 kg (1,3-butadiene content=500 g) of a mixture solution of 1,3-butadiene/hexane was added, and the catalyst composition prepared above was added. Then, polymerization reaction was performed at 70 r for each polymerization time listed in Table 1 below to prepare an active butadiene polymer.

To the active polymer, a hexane solution including ethyl 1-(trimethylsilyl)piperidine-4-carboxylate was added as a modifier and reacted under the same temperature conditions as the polymerization conditions for 30 minutes to 60 minutes ([modifier]:[Nd]=1-10:1 eq). Then, a hexane solution including a polymerization quenching agent was injected to finish the reaction, and a hexane solution including an antioxidant was added to finish the reaction.

The polymer thus obtained was put in hot water heated with steam and stirred to remove solvents and roll dried to remove remaining solvents and water to prepare a terminal modified butadiene polymer.

The catalyst activity increase and the conversion ratio improvement effects of the catalyst of the present invention if using a butadiene-based polymer were evaluated according to aging conditions.

The catalyst aging conditions, polymerization time and consequent conversion ratio and catalyst activity obtained of Examples 1 to 5, Reference Example 1 and Comparative Examples 1 to 5 were measured and shown in Table 1 below.

Here, the conversion ratio (%) was computed after measuring the weight of the conjugated diene-based monomer injected before polymerization reaction, and the weight of unreacted monomer, i.e., recovered monomer after reaction according to the following Mathematical Formula 2:

[Mathematical Formula 2]

$$(\text{conversion ratio}) = \frac{(\text{initial monomer amount}) - (\text{unreacted monomer amount})}{(\text{initial monomer amount})} \times 100$$

In addition, the catalyst activity was computed after measuring the mole number of a rare earth element compound, for example, a neodymium compound included in a catalyst, polymerization time, and the weight of the conjugated diene-based polymer thus prepared according to the following Mathematical Formula 3, where the unit thereof may be kg[polymer]/mol[Nd]-h, if a neodymium element is used as the rare earth element-containing compound:

[Mathematical Formula 3]

$$(\text{catalyst activity}) = \frac{(\text{polymer weight})}{(\text{mole number of rare earth element compound in catalyst}) \times (\text{polymerization time})}$$

TABLE 1

| Division | Aging conditions Aging temperature (° C.) | Aging time (hr) | Polymerization time (min) | Conversion ratio (%) | Catalyst activity* |
|---|---|---|---|---|---|
| Example 1 | −10 | 4 | 15 | 100 | 2000 |
| Example 2 | −10 | 18 | 15 | 100 | 2000 |
| Example 3 | −10 | 96 | 30 | 100 | 1000 |
| Example 4 | −5 | 4 | 20 | 100 | 1500 |
| Example 5 | −15 | 4 | 15 | 100 | 2000 |
| Reference Example 1* | — | — | 60 | 100 | 500 |
| Comparative Example 1 | — | — | 60 | 100 | 500 |
| Comparative Example 2 | −20 | 4 | 20 | 100 | 1500 |
| Comparative Example 3 | 20 | 4 | 60 | 100 | 500 |
| Comparative Example 4 | −10 | 1 | 60 | 100 | 500 |
| Comparative Example 5 | −10 | 168 | 90 | 95 | 317 |

*The unit of catalyst activity is kg[polymer]/mol[Nd] · h.
*Reference Example 1 corresponds to resultant values for a butadiene polymer prepared using the catalyst of Comparative Example 1 but for an unreacted butadiene polymer which was unmodified with a modifier.

As shown in Table 1, Examples 1 to 5, which went through a catalyst aging step according to an embodiment of the present invention, were found to show further decreased polymerization time for accomplishing the same conversion ratio and markedly increased catalyst activity when compared with Comparative Examples 2 to 5, which went though an aging step with conditions deviated from the aging conditions of the present invention. Accordingly, it was found that if the catalyst prepared according to the present invention was used, polymerization efficiency was improved to an excellent degree.

Experimental Example 2

With respect to the butadiene polymers prepared using the catalysts of Examples 1 to 5, Reference Example 1, and Comparative Examples 1 to 5 according to Experimental Example 1, various physical properties were measured by the methods below, and the results are shown in Table 2.

1) Microstructure Analysis

The cis and trans bond contents (%) and the vinyl content (%) in each polymer were measured using Varian VNMRS 500 MHz NMR, and 1,1,2,2-tetrachloroethane D2 (Cambridge Isotope Co.) was used as a solvent.

2) Weight Average Molecular Weight (Mw), Number Average Molecular Weight (Mn) and Molecular Weight Distribution (MWD)

Each polymer was dissolved in tetrahydrofuran (THF) for 30 minutes under 40° C. conditions, and the resultant solution was loaded on gel permeation chromatography (GPC) and flown. Each molecular weight (Mw, Mn) and molecular weight distribution were measured. In this case, two columns of PLgel Olexis (trade name, Polymer Laboratories Co. Ltd.) and one column of PLgel mixed-C were used in combination. Also, newly replaced columns were all mixed bed type columns, and polystyrene was used as a GPC standard material.

3) Mooney viscosity (ML1+4, @100° C.) (MV)

The mooney viscosity (ML1+4, @100° C.) (MV) was measured by using MV2000E of Monsanto Co. using Large Rotor at a rotor speed of 2±0.02 rpm conditions at 100° C. for each polymer. In this case, a specimen used was stood at room temperature (23±3° C.) for 30 minutes or more, and 27±3 g of the specimen was collected and put in a die cavity, and then, Platen was operated and the mooney viscosity was measured while applying torque.

4) Modification ratio

The modification ratio of each modified butadiene polymer prepared using the catalysts of Examples 1 to 5 and Comparative Examples 1 to 5, and the unmodified butadiene polymer prepared in Reference Example 1 were measured.

Particularly, each polymer was dissolved in cyclohexane (first solvent) to prepare each specimen (prepared in 1.0 mg/ml each), and the specimen was stored in a mobile phase reservoir. In another mobile phase reservoir, tetrahydrofuran (THF) was stored. The mobile phase reservoirs were connected with a dual-head pump, respectively, and first, the solution in which the polymer was dissolved in the mobile phase reservoir was injected into a column filled with a silica adsorbent through the pump and an injector having a loop volume of 100 μl. In this case, the pressure of the pump was 450 psi, and an injection flow rate was 0.7 ml/min. Then, after confirming that there was no unmodified butadiene polymer unit in the polymer from a detector (ELSD, Waters Co.), based on 5 minutes from the initiation of the injection, the tetrahydrofuran was injected into the column through the pump. In this case, the pressure of the pump was 380 psi, and an injection flow rate was 0.7 ml/min. After confirming that there was no modified butadiene polymer unit in the polymer from the detector according to the injection of the tetrahydrofuran (second solvent), the injection of the second solvent was finished. Then, the modification ratio (%) was calculated from the detected chromatogram results (FIGS. 1 to 5) using the following Mathematical Formula 1:

[Mathematical Formula 1]

$$\text{modification ratio (\%)} = \frac{\text{peak area of modified polymer}}{\text{peak area of unmodified polymer} + \text{peak area of modified polymer}} \times 100$$

As shown in Table 2, it was found that Examples 1 to 5, which went through an aging step of a catalyst according to an embodiment of the present invention showed markedly improved modification ratio when compared with Comparative Example 1 and Reference Example 1, which omitted an aging step and Comparative Examples 2 to 5, which went through an aging step with conditions deviated from the aging conditions of the present invention. Accordingly, if a polymer prepared using the catalyst prepared according to the present invention is modified, excellent modification ratio may be achieved, and the polymer may have improved affinity with a filler such as silica and a molded article may have improved processing properties, viscoelasticity properties and mechanical properties.

Figure 2:
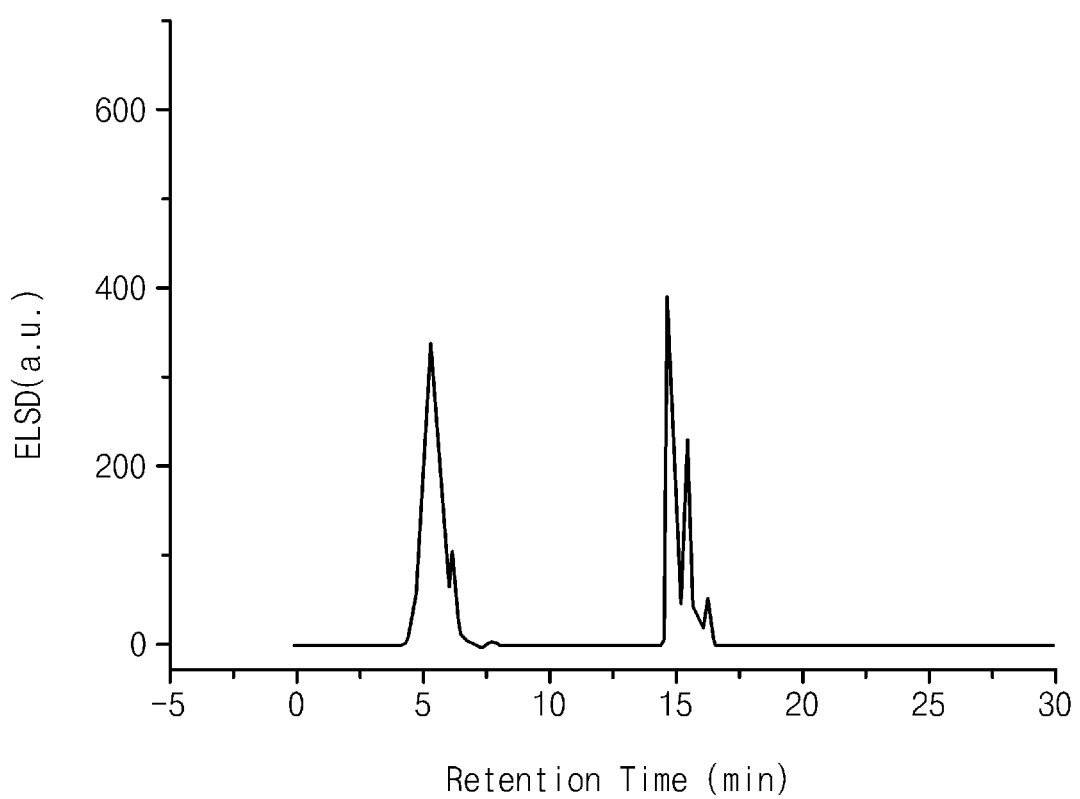
FIG. 2 is a graph showing a chromatogram of Example 2 of the present invention.
Figure 3:
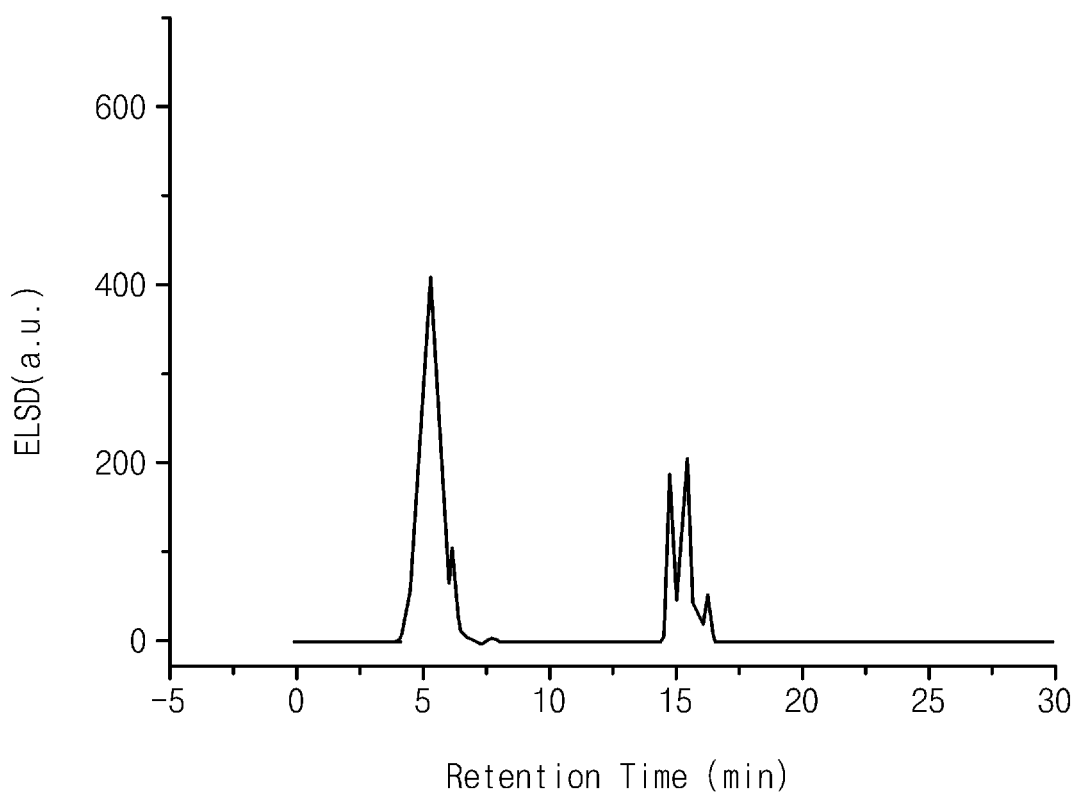
FIG. 3 is a graph showing a chromatogram of Example 3 of the present invention.
Figure 4:
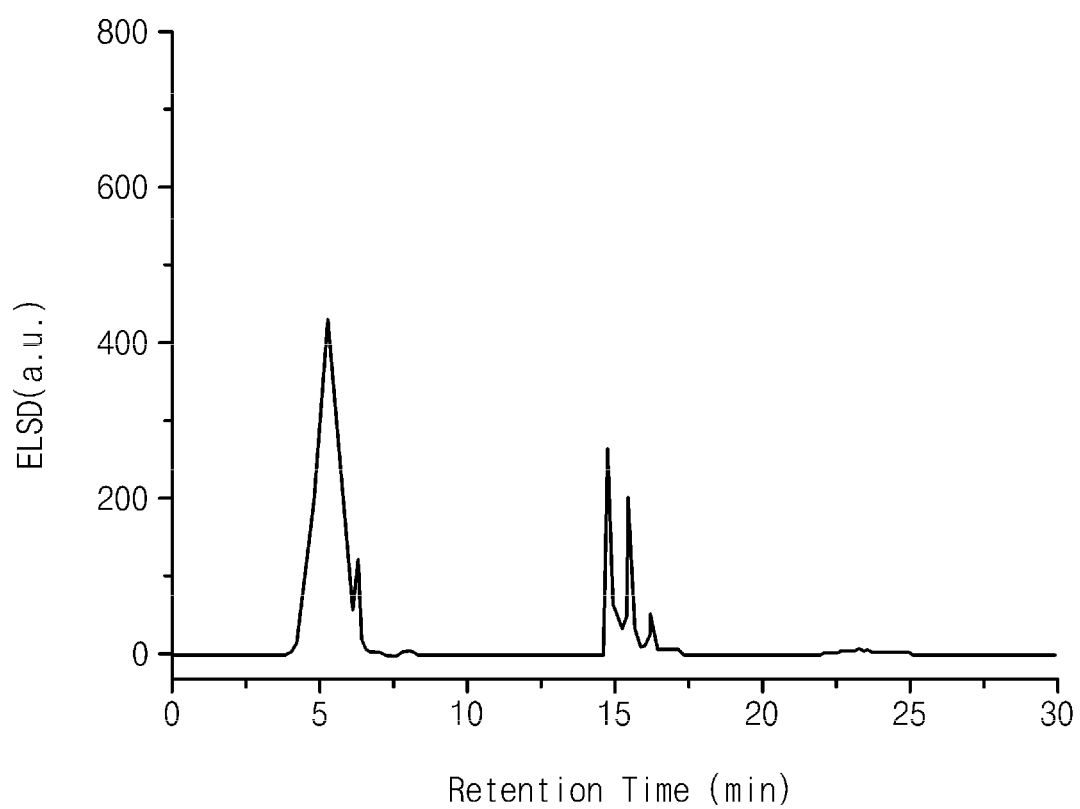
FIG. 4 is a graph showing a chromatogram of Comparative Example 1.
Figure 5:
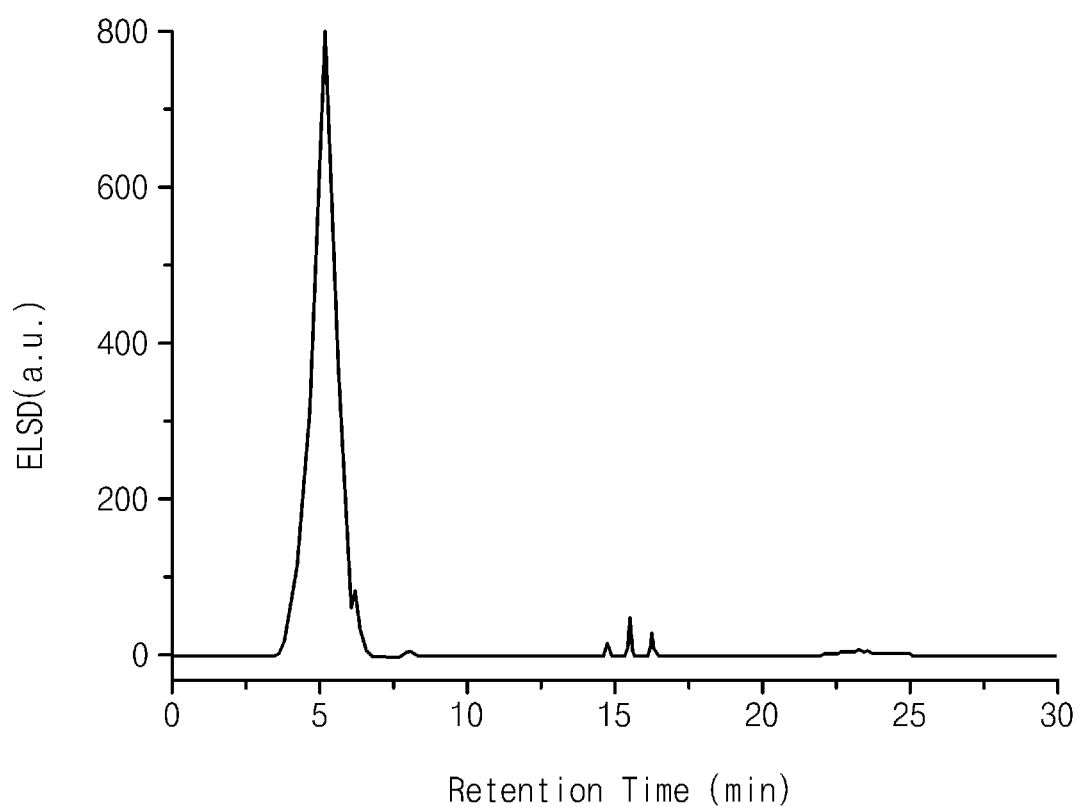
FIG. 5 is a graph showing a chromatogram of Reference Example 1 of the present invention.

Meanwhile, it may be confirmed that the polymer according to an embodiment of the present invention has excellent modification ratio through the chromatograms shown in FIGS. 1 to 5. Particularly, in the chromatograms of the polymers according to Examples 1 to 3 of the present invention, as shown in FIGS. 1 to 3, it was found that the peak area in an unmodified polymer elution section, which forms peaks after injecting a mixture solution of the first solvent and the polymer, was decreased when compared with Comparative Example 1 as shown in FIG. 4 and Reference Example 1 as shown in FIG. 5, and the peak area in the elution section of a modified polymer, which forms peaks after injecting the second solvent, was increased when compared with the Comparative Example and the Reference Example. Accordingly, it may be confirmed that the polymer of the Example has higher ratio of a modified polymer than the Comparative Example.

Experimental Example 3

Rubber compositions and rubber specimens were prepared using the modified butadiene polymers prepared using the catalysts of the Examples and the Comparative Example and the butadiene polymer prepared in the Reference Example according to Experimental Example 1, and then, 300% modulus and viscoelasticity properties were measured, respectively, according to the methods below, and the results are shown in Table 3.

Particularly, each rubber composition was prepared by compounding 100 parts by weight of each polymer with 70 parts by weight of carbon black, 22.5 parts by weight of a process oil, 2 parts by weight of an antiaging agent (TMDQ),

TABLE 2

| | | Division | | | | | | | | | | |
|---|---|---|---|---|---|---|---|---|---|---|---|---|
| | | Example | | | | | Reference | Comparative Example | | | | |
| | | 1 | 2 | 3 | 4 | 5 | Example 1 | 1 | 2 | 3 | 4 | 5 |
| Micro structure analysis | Cis-1,4 bond (%) | 96.7 | 96.8 | 96.7 | 96.6 | 96.7 | 96.9 | 96.5 | 96.8 | 96.7 | 96.8 | 96.7 |
| | Trans-1,4 bond (%) | 2.5 | 2.4 | 2.5 | 2.6 | 2.5 | 2.3 | 2.7 | 2.4 | 2.5 | 2.4 | 2.5 |
| | Vinyl (%) | 0.8 | 0.8 | 0.8 | 0.8 | 0.8 | 0.8 | 0.8 | 0.8 | 0.8 | 0.8 | 0.8 |
| GPC results | Mn ($\times 10^5$ g/mol) | 1.83 | 1.90 | 2.12 | 1.81 | 1.92 | 2.15 | 2.11 | 1.88 | 1.92 | 1.96 | 1.85 |
| | Mw ($\times 10^5$ g/mol) | 4.54 | 4.66 | 5.26 | 4.45 | 4.80 | 5.78 | 5.74 | 4.61 | 5.43 | 5.35 | 5.33 |
| | MWD (Mw/Mn) | 2.48 | 2.45 | 2.48 | 2.46 | 2.50 | 2.69 | 2.72 | 2.45 | 2.83 | 2.73 | 2.88 |
| Mooney viscosity | | 45.6 | 46.3 | 47.5 | 43.5 | 46.7 | 48.2 | 49.1 | 44.8 | 42.3 | 45.5 | 48.6 |
| Modification ratio (mol %) | | 26.0 | 32.6 | 27.4 | 25.3 | 26.3 | 1.6 | 20.5 | 21.1 | 19.5 | 18.8 | 10.9 |

3 parts by weight of zinc white (ZnO), and 2 parts by weight of stearic acid. Then, to each rubber composition, 2 parts by weight of sulfur, 2 parts by weight of a vulcanizing accelerator (CZ) and 0.5 parts by weight of a vulcanization accelerator (DPG) were added and gently mixed at 50° C. for 1.5 minutes in 50 rpm. Then, by using a roll of 50° C., a vulcanized compounding product having a sheet shape was obtained. The vulcanized compounding product thus obtained was vulcanized at 160° C. for 25 minutes to manufacture a rubber specimen.

1) 300% modulus

After vulcanizing each rubber composition at 150° C. for t90 minutes, the modulus when elongated by 300% (M-300%) of the vulcanized product was measured according to an ASTM D412, and the measured value was index with setting the measured value of Comparative Example 1 to 100 (Index value).

Accordingly, it was found that with the increase of the value of M-300% Index (M-300%), tensile properties were improved and mechanical properties were improved.

2) Viscoelasticity properties (Tan δ @60° C.)

Tan δ properties, that are the major factors of a low fuel consumption properties were measured as viscoelasticity coefficient (Tan δ) at 60° C. at a frequency of 10 Hz, prestrain of 3%, and dynamic strain of 3% by using DMTS 500N of Gabo Co., Germany. In this case, if the Tan δ value at 60° C. decreased, hysteresis loss decreased and rotation resistance properties were excellent, that is, a fuel consumption ratio was excellent.

In the present invention, the improved degree of each measured value was indexed with setting the measured value of Comparative Example 1 to 100 (Index value). Accordingly, it means that with the increase of the indexed value, hysteresis loss was decreased and low rolling resistance, i.e., low fuel consumption properties were improved.

TABLE 3

| | | Example | | | | | Reference | Comparative Example | | | | |
|---|---|---|---|---|---|---|---|---|---|---|---|---|
| | | 1 | 2 | 3 | 4 | 5 | Example 1 | 1 | 2 | 3 | 4 | 5 |
| Tensile properties (Index) | M-300% | 102 | 105 | 104 | 101 | 102 | 95 | 100 | 99 | 98 | 98 | 96 |
| Viscoelasticity properties (Index) | Tan δ at 60° C. | 104 | 110 | 108 | 105 | 105 | 94 | 100 | 101 | 100 | 98 | 95 |

As shown in Table 3, it was found that Examples 1 to 5, which went through an aging step of a catalyst according to an embodiment of the present invention showed higher M-300 modulus index values and markedly improved Tan δ @60° C. index values, which were measured values of the viscoelasticity properties when compared with Comparative Example 1 and Reference Example 1, which omitted an aging step and Comparative Examples 2 to 5, which went through an aging step with conditions deviated from the aging conditions of the present invention. That is, if the modified polymer prepared according to the present invention is applied to a rubber molded article, a molded article having excellent mechanical strength such as tensile properties, improved viscoelasticity properties to decrease hysteresis loss, and excellent low rolling resistance may be manufactured.

The invention claimed is:

1. A method for preparing a conjugated diene-based polymer, the method consisting of:

mixing a lanthanide rare earth element-containing compound, an alkylating agent compound and a halogen compound in the presence of a non-polar hydrocarbon-based solvent to prepare a catalyst composition;

adding a first conjugated diene-based monomer to the catalyst composition to form a preformed catalyst composition; and aging the preformed catalyst composition at a temperature of −8° C. to −12° C. for 17 hours to 20 hours to prepare the catalyst, polymerizing a second conjugated diene-based monomer in the presence of the catalyst, and adding a modifier and performing a modification reaction.

2. The method according to claim 1, wherein the aging step is performed under nitrogen ($N_2$) conditions.

3. The method according to claim 1, wherein the lanthanide rare earth element-containing compound comprises a neodymium compound represented by the following Formula 1:

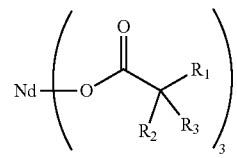

[Formula 1]

in Formula 1, $R_1$ to $R_3$ are each independently a hydrogen atom, or a linear or branched alkyl group of 1 to 12 carbon atoms.

4. The method according to claim 3, where $R_1$ is a linear or branched alkyl group of 6 to 12 carbon atoms, and $R_2$ and $R_3$ are each independently a hydrogen atom or a linear or branched alkyl group of 2 to 8 carbon atoms, but $R_2$ and $R_3$ are not hydrogen atoms at the same time.

5. The method according to claim 1, wherein the alkylating agent compound comprises an organoaluminum compound represented by the following Formula 2:

[Formula 2]

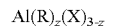

[Formula 2]

in Formula 2,

R is each independently a hydrocarbyl group; or a heterohydrocarbyl group comprising at least one heteroatom selected from the group consisting of a nitrogen atom, an oxygen atom, a boron atom, a silicon atom, a sulfur atom and a phosphor atom in a hydrocarbyl group, X is each independently selected from the group consisting of a hydrogen atom, a halogen group, a carboxyl group, an alkoxy group and an aryloxy group, and z is an integer of 1 to 3.

6. The method according to claim 1, wherein the halogen compound comprises any one selected from the group consisting of a diatomic halogen, an interhalogen compound, a hydrogen halide, an organic halide, a nonmetal halide, a metal halide, an organometal halide, and mixtures thereof.

7. The method according to claim 1, wherein the mixing step is performed at 10° C. to 30° C.

8. The method according to claim 1, wherein 5 to 20 mol of the alkylating agent compound, 2 to 6 mol of the halogen compound and 100 to 1,000 mol of the solvent are used with respect to 1 mol of the lanthanide rare earth element-containing compound.

9. The method according to claim 1, wherein the modifier is ethyl 1-(trimethylsilyl)piperidine-4-carboxylate or (E)-N,N-dimethyl-4-((undecylimino)methyl)benzenamine.

\* \* \* \* \*